US008720369B2

(12) United States Patent
Rayman et al.

(10) Patent No.: US 8,720,369 B2
(45) Date of Patent: May 13, 2014

(54) MASKING SYSTEM FOR COATING AIRCRAFT COMPONENTS

(75) Inventors: Jason E. Rayman, Delray Beach, FL (US); Richard W. Brown, Sunrise, FL (US)

(73) Assignee: The Lost Boy Group, LLC, Delray Beach, FL (US)

( * ) Notice: Subject to any disclaimer, the term of this patent is extended or adjusted under 35 U.S.C. 154(b) by 131 days.

(21) Appl. No.: 13/301,337

(22) Filed: Nov. 21, 2011

(65) Prior Publication Data

US 2013/0125812 A1 May 23, 2013

(51) Int. Cl.

| | |
|---|---|
| ***B05C 11/11*** | (2006.01) |
| ***B05B 15/04*** | (2006.01) |
| ***B05C 3/00*** | (2006.01) |
| ***B60B 21/00*** | (2006.01) |
| ***B60B 1/00*** | (2006.01) |
| ***B60B 7/00*** | (2006.01) |
| ***B64C 25/32*** | (2006.01) |
| ***B65D 85/02*** | (2006.01) |
| *B05D 1/32* | (2006.01) |

(52) U.S. Cl.
CPC .............. *B05B 15/0487* (2013.01); *B05D 1/32* (2013.01)
USPC ........... 118/505; 118/301; 118/406; 118/504; 427/282; 301/103; 301/104; 301/37.101; 301/37.102; 301/37.103; 244/103 R; 206/303

(58) Field of Classification Search
USPC .......... 118/504, 500, 301, 406; 301/103, 104, 301/37.101, 37.102, 37.103, 37.104; 244/103 R; 206/303; 427/282
See application file for complete search history.

(56) References Cited

U.S. PATENT DOCUMENTS

| | | | | | |
|---|---|---|---|---|---|
| 2,388,835 | A * | 11/1945 | Duggan | ........................ | 118/505 |
| 2,716,391 | A * | 8/1955 | Nonemaker et al. | .......... | 118/505 |
| 2,726,634 | A * | 12/1955 | Horner | .......................... | 118/505 |
| 2,954,752 | A * | 10/1960 | Hayward | ...................... | 118/505 |
| 3,141,794 | A * | 7/1964 | Horner | .......................... | 118/505 |
| 3,192,896 | A * | 7/1965 | Irving | ........................... | 118/505 |
| 3,841,261 | A * | 10/1974 | Hudson et al. | ................ | 118/505 |
| 3,873,160 | A * | 3/1975 | Mayrand | ........................ | 301/5.1 |
| 4,285,378 | A * | 8/1981 | Wallace | ........................ | 411/258 |
| 4,304,279 | A * | 12/1981 | Thomas | ........................ | 206/303 |
| 4,695,486 | A * | 9/1987 | Stark | ............................. | 427/282 |
| 4,697,544 | A * | 10/1987 | Stevens et al. | ................ | 118/504 |
| 4,856,954 | A * | 8/1989 | Peterson | ....................... | 411/427 |
| 4,874,206 | A * | 10/1989 | Sampson | ................. | 301/37.103 |
| 5,070,810 | A * | 12/1991 | Dieter | ........................... | 118/505 |
| 5,127,520 | A * | 7/1992 | Thomas | ........................ | 206/303 |
| 5,221,170 | A * | 6/1993 | Duffy et al. | ................... | 411/428 |
| 5,255,874 | A * | 10/1993 | Roussel | .................... | 244/103 R |
| 5,328,723 | A * | 7/1994 | Horiki et al. | .................. | 427/272 |

(Continued)

*Primary Examiner* — Dah-Wei D Yuan
*Assistant Examiner* — Karl Kurple
(74) *Attorney, Agent, or Firm* — McHale & Slavin, P.A.

(57) ABSTRACT

The present invention relates to the application of surface coatings to treated aluminum articles utilized on aircraft, and more particularly to a system for masking portions of aluminum aircraft wheel and brake components for application of surface coatings to reduce or prevent wear and/or corrosion to the aluminum article. The system may be utilized for new aluminum aircraft components as well as aircraft components that have been subjected to non-destructive testing. The masking components are constructed and arranged to cooperate with portions of the aluminum component in a sequential manner to allow for application of multiple layers of primer and/or topcoat without removal of prior masking components so that a coated component complies with the manufacturer's written requirements for that component.

19 Claims, 34 Drawing Sheets

(56) References Cited

U.S. PATENT DOCUMENTS

| | | | | |
|---|---|---|---|---|
| 5,435,630 | A * | 7/1995 | Tucker | 301/37.103 |
| 5,667,590 | A * | 9/1997 | Simons, Sr. | 118/504 |
| 5,766,358 | A * | 6/1998 | Oliver | 118/504 |
| 5,979,994 | A * | 11/1999 | Harmon | 301/37.102 |
| 6,227,623 | B1 * | 5/2001 | Bellow | 301/37.42 |
| 6,299,951 | B1 * | 10/2001 | Dauner | 428/35.7 |
| 6,678,956 | B2 * | 1/2004 | Idetsu et al. | 29/898.12 |
| 6,685,276 | B2 * | 2/2004 | Kenion | 301/37.103 |
| 6,759,089 | B2 * | 7/2004 | Bastow | 427/282 |
| 6,913,322 | B1 * | 7/2005 | Allen | 301/37.371 |
| 6,984,438 | B1 * | 1/2006 | Nickel | 428/156 |
| 7,314,524 | B1 * | 1/2008 | Rolleri, Jr. | 118/504 |
| 7,597,403 | B1 * | 10/2009 | Henry | 301/37.103 |
| 7,806,484 | B1 * | 10/2010 | Young | 301/37.104 |
| 8,136,475 | B2 * | 3/2012 | Davis et al. | 118/301 |
| 8,251,010 | B2 * | 8/2012 | Sasaki et al. | 118/505 |
| 2004/0075022 | A1 * | 4/2004 | MacKness | 244/100 R |
| 2005/0104440 | A1 * | 5/2005 | Culbert, III | 301/37.104 |
| 2006/0057289 | A1 * | 3/2006 | Simpson et al. | 427/256 |
| 2007/0256634 | A1 * | 11/2007 | Simpson et al. | 118/406 |
| 2008/0035054 | A1 * | 2/2008 | Dickens | 118/504 |
| 2008/0136247 | A1 * | 6/2008 | Janty | 301/37.104 |
| 2012/0204794 | A1 * | 8/2012 | Ko | 118/721 |
| 2012/0270005 | A1 * | 10/2012 | Baratta | 428/77 |
| 2012/0276298 | A1 * | 11/2012 | Helmers | 427/468 |
| 2013/0200682 | A1 * | 8/2013 | Waldt | 301/37.104 |

* cited by examiner

WHEEL ASSEMBLY CUTAWAY VIEW

3 — PP PRIMER OVERSPRAY PERMITTED
1 — NP NO PRIMER OR PAINT
2 — PO PRIMER ONLY
4 — PT PRIMER AND PAINT
2 — PM PRIMER ONLY. MASK TO 1.325 - 1.500 inches (33,7 - 38,1 mm) DIAMETER FOR APPLICATION OF PAINT.

3 — PP PRIMER OVERSPRAY PERMITTED

1 — NP NO PRIMER OR PAINT

2 — PO PRIMER ONLY

4 — PT PRIMER AND PAINT

2 — PM PRIMER ONLY. MASK TO 1.325 - 1.500 inches (33,7 - 38,1 mm) DIAMETER FOR APPLICATION OF PAINT.

MASKING SYSTEM FOR COATING AIRCRAFT COMPONENTS

FIELD OF THE INVENTION

This invention relates to treated aluminum articles for aircraft, and more particularly to a system for masking portions of aluminum wheel and brake components for application of surface coatings to reduce or prevent wear and/or corrosion to the aluminum article. The system may be utilized for new aluminum aircraft components as well as aircraft components that have been subjected to non-destructive testing.

BACKGROUND OF THE INVENTION

Aluminum alloys are typically utilized for wheel and brake components on an aircraft. For example, aluminum alloys that are commonly used in wheel structures for aircraft include Aluminum Association Series alloys 2014-T6, 2040-T6 and 7050-T74. These alloys are specific alloys within the Aluminum Association Series of alloy classes 2XXX and 7XXX, respectively. These alloys are attractive due to their high strength and fracture toughness characteristics. Although the 2XXX and 7XXX aluminum alloys exhibit high strength characteristics, they are more prone to corrosion than other aluminum alloys. This corrosion includes general corrosion, pitting, stress corrosion cracking, and intergranular attack.

To counteract the problems related to corrosion, aluminum aircraft wheel and brake components are provided with a hard anodized coating. One type of accepted hard-anodized coating involves the application of a sulfuric acid anodic coating in combination with a sodium dichromate sealant to the aluminum surface. Thereafter, depending on the type of wheel assembly and the manufacturer's recommendations, portions of the wheel or brake may be further coated over the hard anodizing with the application of a primer. Other portions of the wheel may be further coated with a paint type topcoat.

One common type of aircraft wheel includes an inner wheel half and an outer wheel half. Bolts, washers and nuts hold the two halves together while an o-ring seals the joint between the two wheel halves. The inner wheel half additionally includes drive lugs or inserts for the interaction with the brake assemblies, and may include heat shields to reduce the transfer of brake heat to the wheel. An inner bore extends through both halves of the wheel and is constructed and arranged to house at least two bearing and seal assemblies, and may further be constructed to include retaining rings, grease retainers or the like. In addition, either half of the wheel may include sensors, thermal relief plugs, over-inflation plugs or the like that require ports or bores that extend through the thickness of the wheel. Another type of aircraft wheel includes an inner wheel half and an outer wheel half. The inner and outer halves are held together by a split ring.

Current maintenance practices for aircraft wheels require inspections of aircraft wheels at predetermined intervals and for various reasons. For example, inspections may be required for wheels that have exceeded a predetermined number of landings or have had a predetermined number of tire changes; or the aircraft may have suffered a catastrophic tire failure or an inspection may be required at annual aircraft inspections. While some of these inspections are simply visual inspections that can be accomplished by merely removing the tire from the rim, others require surface coatings to be removed for non-destructive testing (NDT). For example, a fluorescent penetrant inspection (FPI) is required during every major overhaul. In order to perform this inspection, the paint must be removed from the wheel. Following NDT inspection, provided the wheel checks to standards, the primers, lubricants and topcoats are reapplied to the wheel. The task of stripping and reapplying the paint for FPI inspection during maintenance and overhaul is labor intensive and significantly increases the cost of maintaining the aircraft.

In general, paint is removed from the wheel using chemical paint remover, or media blast equipment utilizing media like walnut shells, plastic, water or other media suitable for removing lubricant, primer and topcoat without damaging the hard anodized coating of the wheel or brake. The technician then refers to a manual for requirements relating to primer and/or topcoat coatings for the component. Different manufacturers and wheel constructions have different requirement as to which portions of the wheel get the various coatings. In a typical scenario, a technician will apply masking tape, paper, cardboard etc. to portions of a hard-anodized component such as a wheel that is devoid of other surface coatings. Any unwanted tape is thereafter trimmed away with a razor knife until the desired area is masked from receiving primer. The wheel will then be coated with a primer, via an air type spray gun, and dried. This step may be further complicated with the requirement of applying primer to both sides of the wheel which may require an extra drying cycle. After completion of the primer step, additional portions of the wheel will be masked with tape and trimmed with razor blades for application of a topcoat. The tape and any glue that remains attached to the wheel must be removed with solvents without damaging the primer or topcoat. The wheel can thereafter be assembled and shipped to a desired location for installation on an aircraft until the next inspection is required.

Therefore, there is a need in the art for a system of masking components that are adapted for temporary attachment to various aluminum components, such as aircraft wheels or brake components. The masking components should allow portions of the component to be masked from receiving unwanted surface coatings during an air gun spraying operation. The masking components should also be designed to be added over other masking components sequentially to allow for multiple coatings which may not be over the same portions of the component without removal of the masking components used for earlier coatings. The components should be easily removed after coating the component for reuse on other like constructed components. The masking components should also be constructed from a material that allows easy removal of prior coatings to allow for extended use of the masking components.

SUMMARY OF THE INVENTION

The present invention relates to the application of surface coatings to treated aluminum articles utilized on aircraft, and more particularly to a system for masking portions of aluminum aircraft wheel and brake components for application of surface coatings to reduce or prevent wear and/or corrosion to the aluminum article. The system may be utilized for new aluminum aircraft components as well as aircraft components that have been subjected to non-destructive testing. The masking components are constructed and arranged to cooperate with portions of the aluminum component in a sequential manner to allow for application of multiple layers of primer and/or topcoat without removal of prior masking components so that a coated component complies with the manufacturer's written requirements for that component. There are commercial considerations that are satisfied by the masking system or kit; considerations which are not entirely satisfied by state of the art products. The masking system is formed of relatively few component parts that are inexpensive to manufacture by conventional techniques. The masking system or kit is also capable of being packaged and shipped in a condensed state. In addition, the system is modular and facilitates the creation of a family of masking system and kits which may share common, interchangeable components.

Finally, there are ergonomic needs that the present masking system or kit satisfies to achieve acceptance by the end user. The masking system is easily and quickly assembled using minimal hardware and requiring a minimal number of tools. Further, the system does not require excessive strength to assemble or include heavy component parts. Moreover, the system assembles together in such a way so as not to require removal of previously attached masking components, whereby all of the masking components may be removed in a single operation.

Accordingly, it is an objective of the instant invention to provide a masking system for aluminum aircraft components.

It is a further objective of the instant invention to provide a masking system for aircraft components that is quick and easy to assemble with a minimum amount of tools.

It is yet another objective of the instant invention to provide a masking system for aircraft components that assembles in a sequential manner to allow multiple layers and types of coatings to be sequentially applied without removing the masking components from prior coating operations.

It is a still further objective of the invention to provide a kit of masking elements for masking aircraft components.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
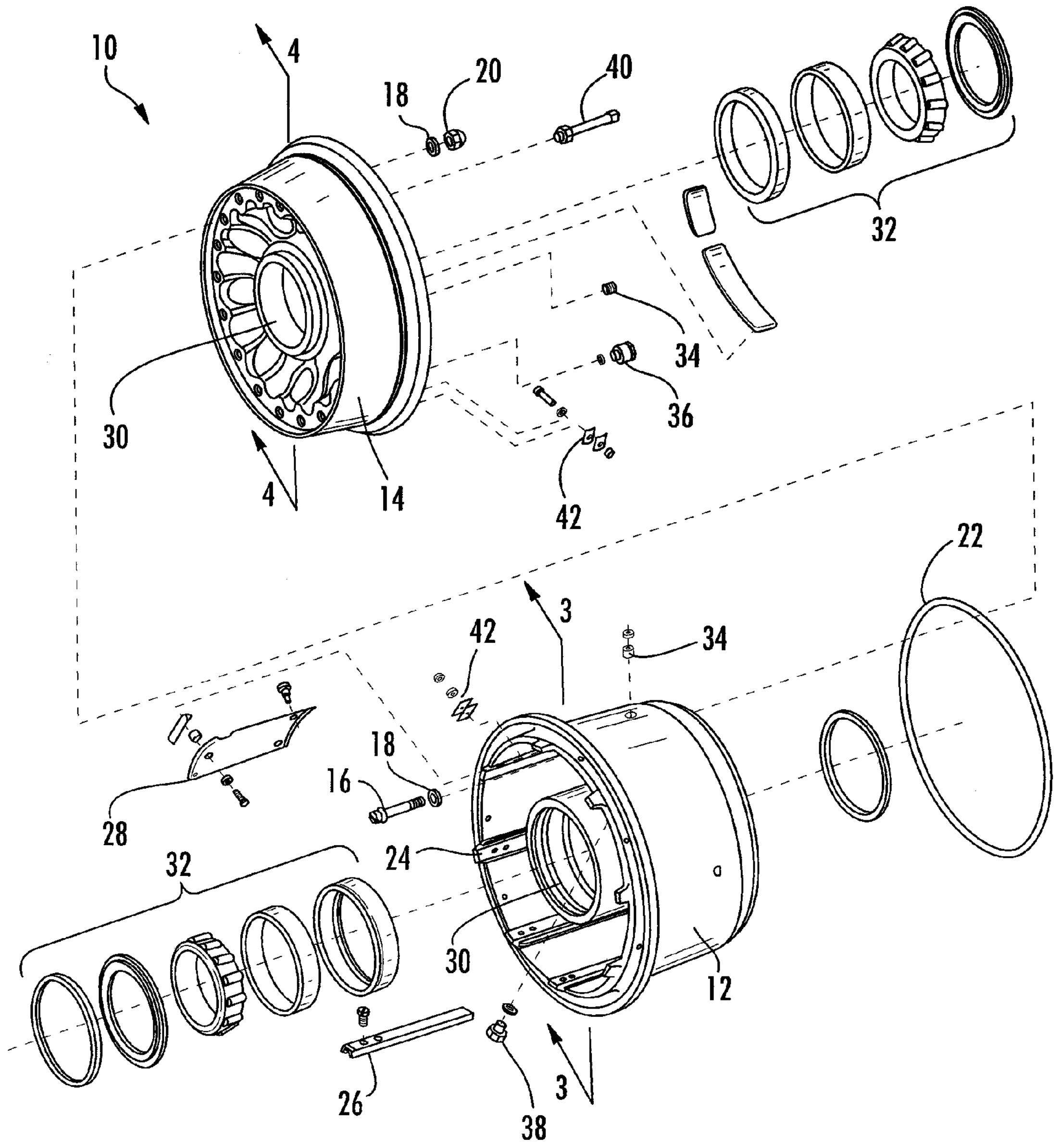
FIG. 1 (PRIOR ART)
FIG. 1 is an exploded view of one type of an aircraft wheel.
Figure 2:
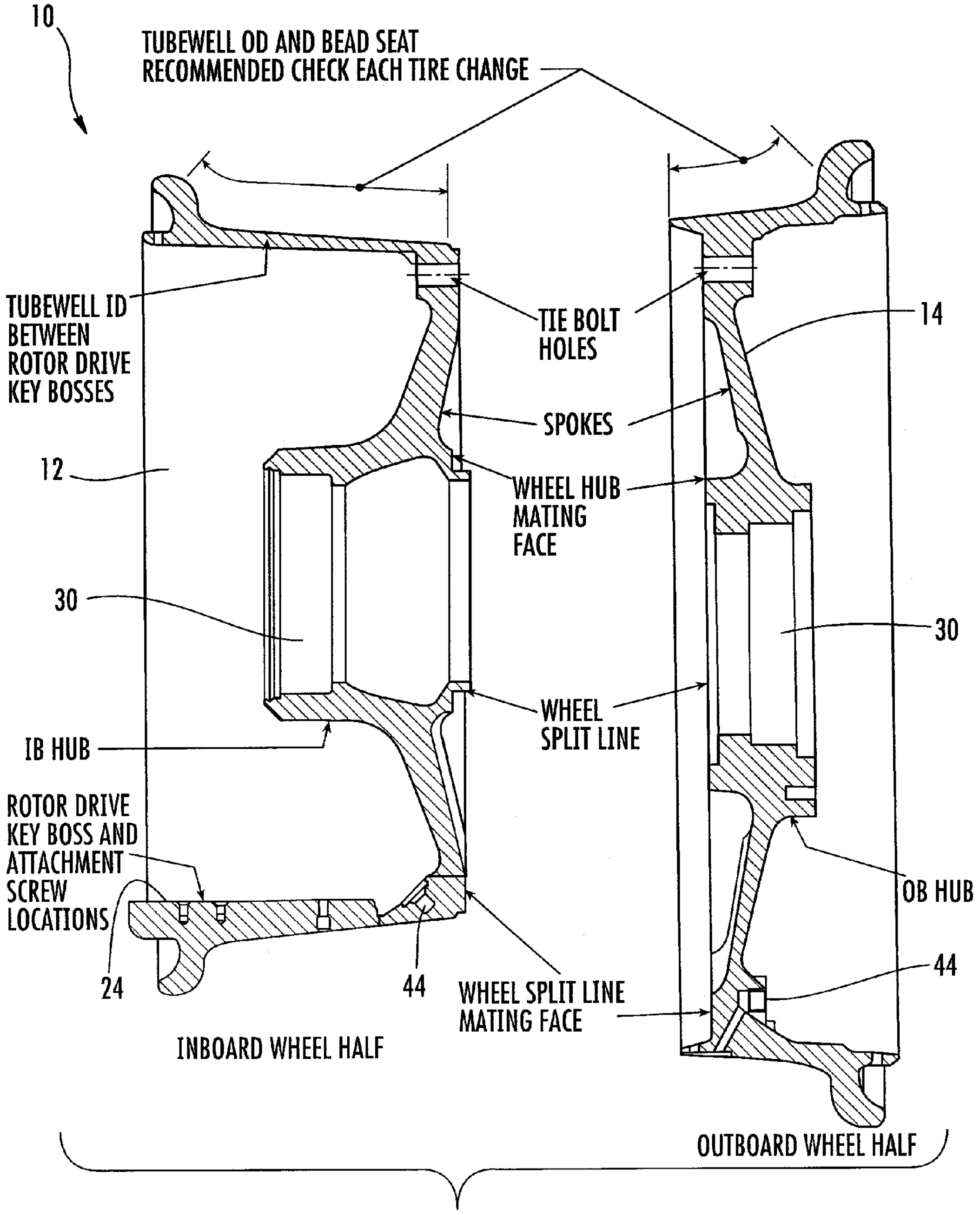
FIG. 2 (PRIOR ART)
FIG. 2 is a section view taken along lines 3-3 and 4-4 of FIG. 1.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1-4, one embodiment of an aircraft wheel 10 is illustrated. The aircraft wheel 10 includes an inner wheel half 12 and an outer wheel half 14. Bolts 16, washers 18 and nuts 20 hold the two wheel halves 12, 14 together while an o-ring 22 seals the joint between the two wheel halves. The inner wheel half 12 additionally includes drive lugs 24 or inserts 26 for the interaction with the brake assemblies and may include heat shields 28 to reduce the transfer of brake heat to the wheel 10. An inner bore 30 extends through both halves of the wheel and is constructed and arranged to house at least two bearing and seal assemblies 32, and may further be constructed to include retaining rings, grease retainers or the like (not shown). In addition, either half of the wheel may include sensors 34, thermal relief plugs 36, over-inflation plugs 38, valve stem assembly 40, wheel weights 42 or the like that require ports 44 or bores that extend through the thickness of the wheel.

Figure 3:
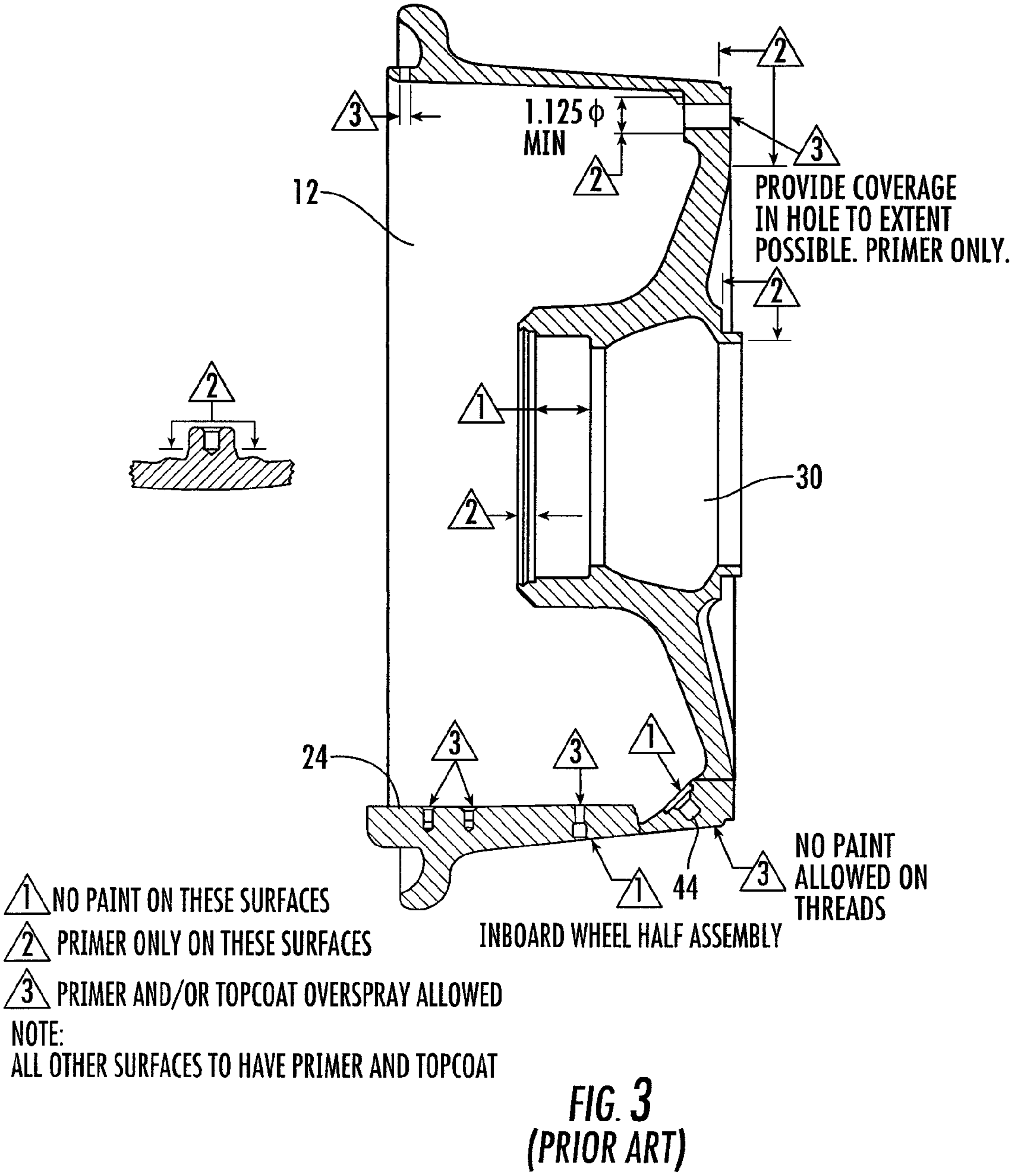
FIG. 3 (PRIOR ART)
FIG. 3 is a section view taken along lines 3-3 of FIG. 1.
Figure 4:
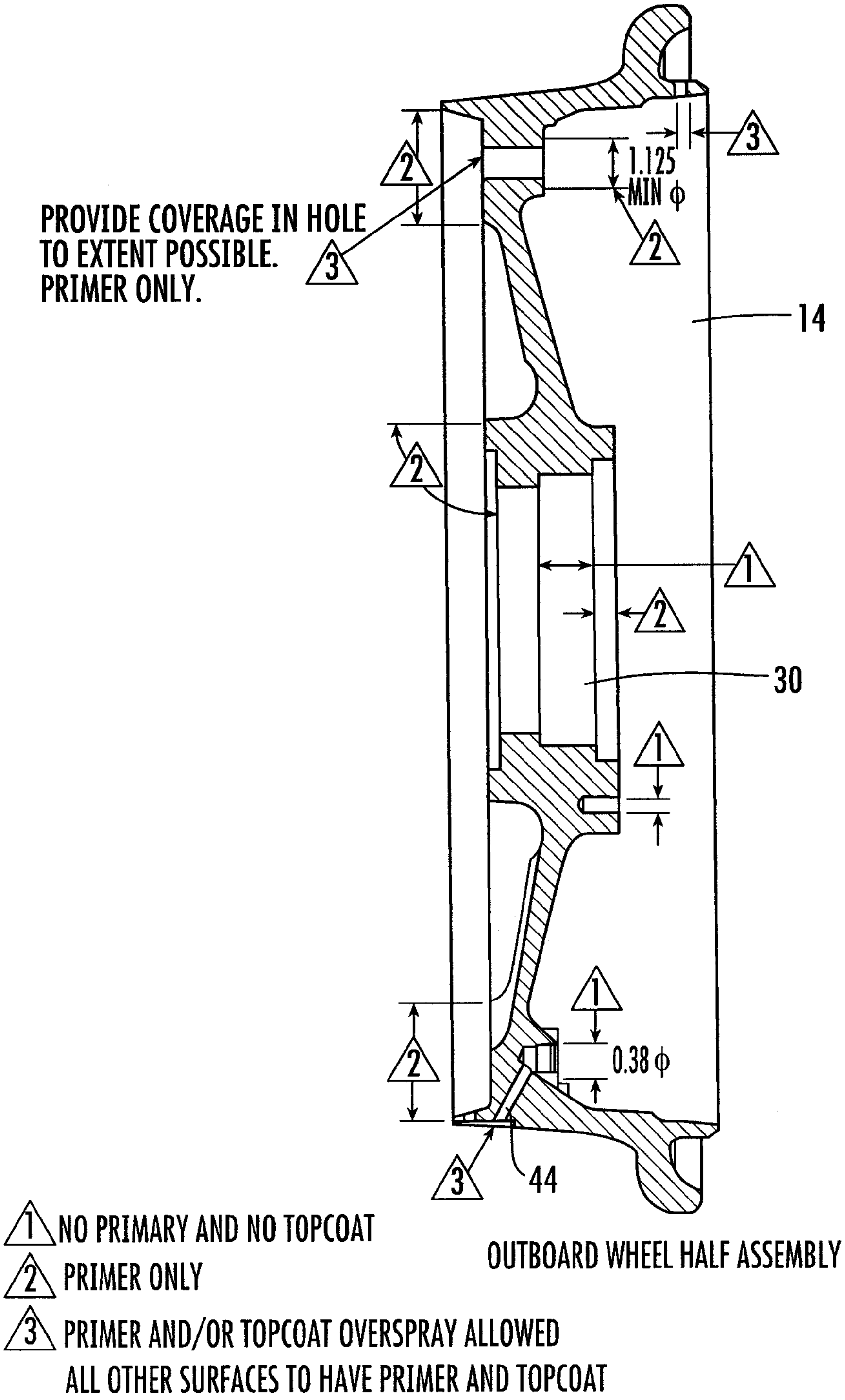
FIG. 4 (PRIOR ART)
FIG. 4 is a section view taken along lines 4-4 of FIG. 1.
Figure 5:
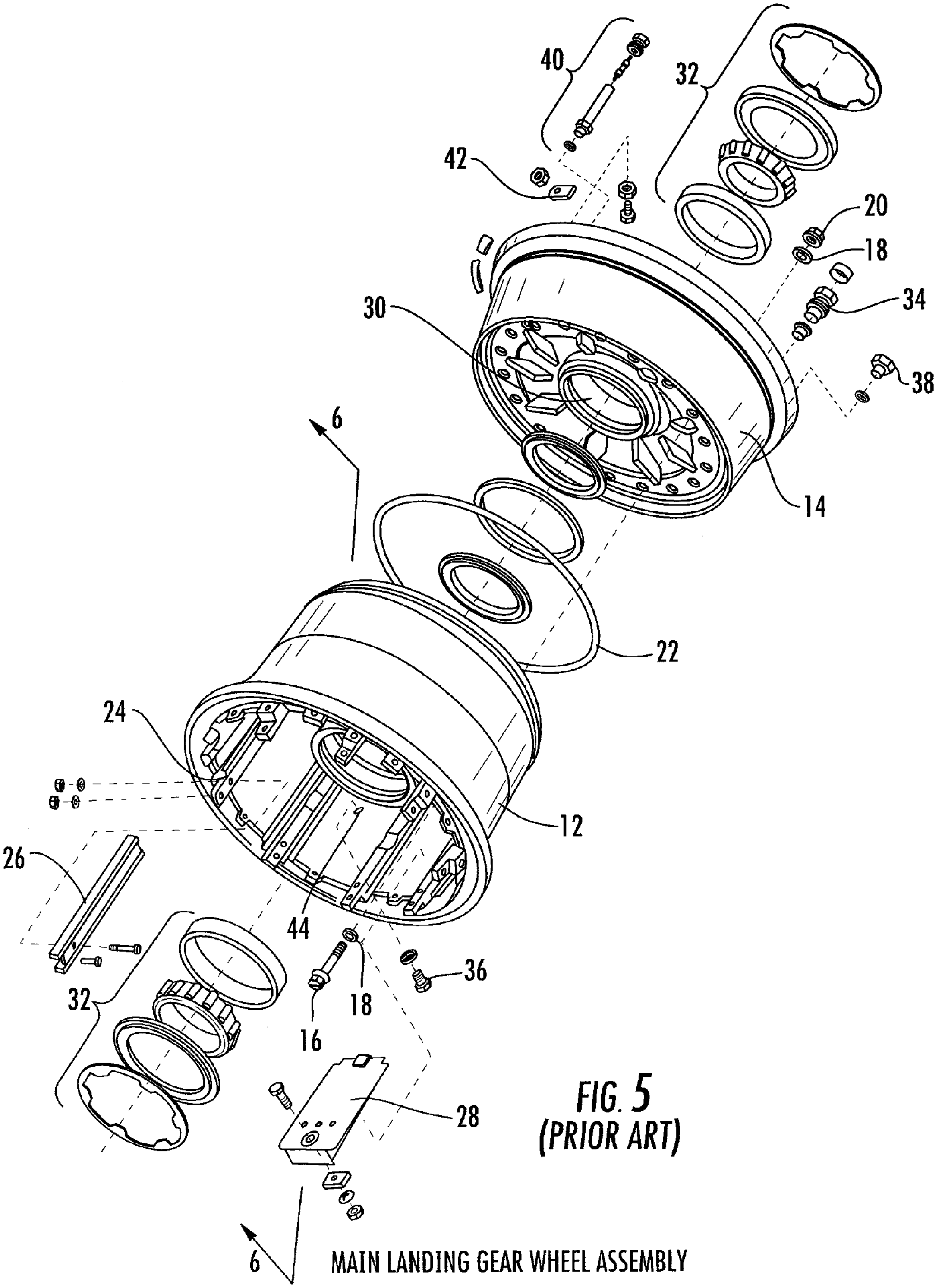
FIG. 5 (PRIOR ART)
FIG. 5 is an exploded view of one type of aircraft wheel.
Figure 6:
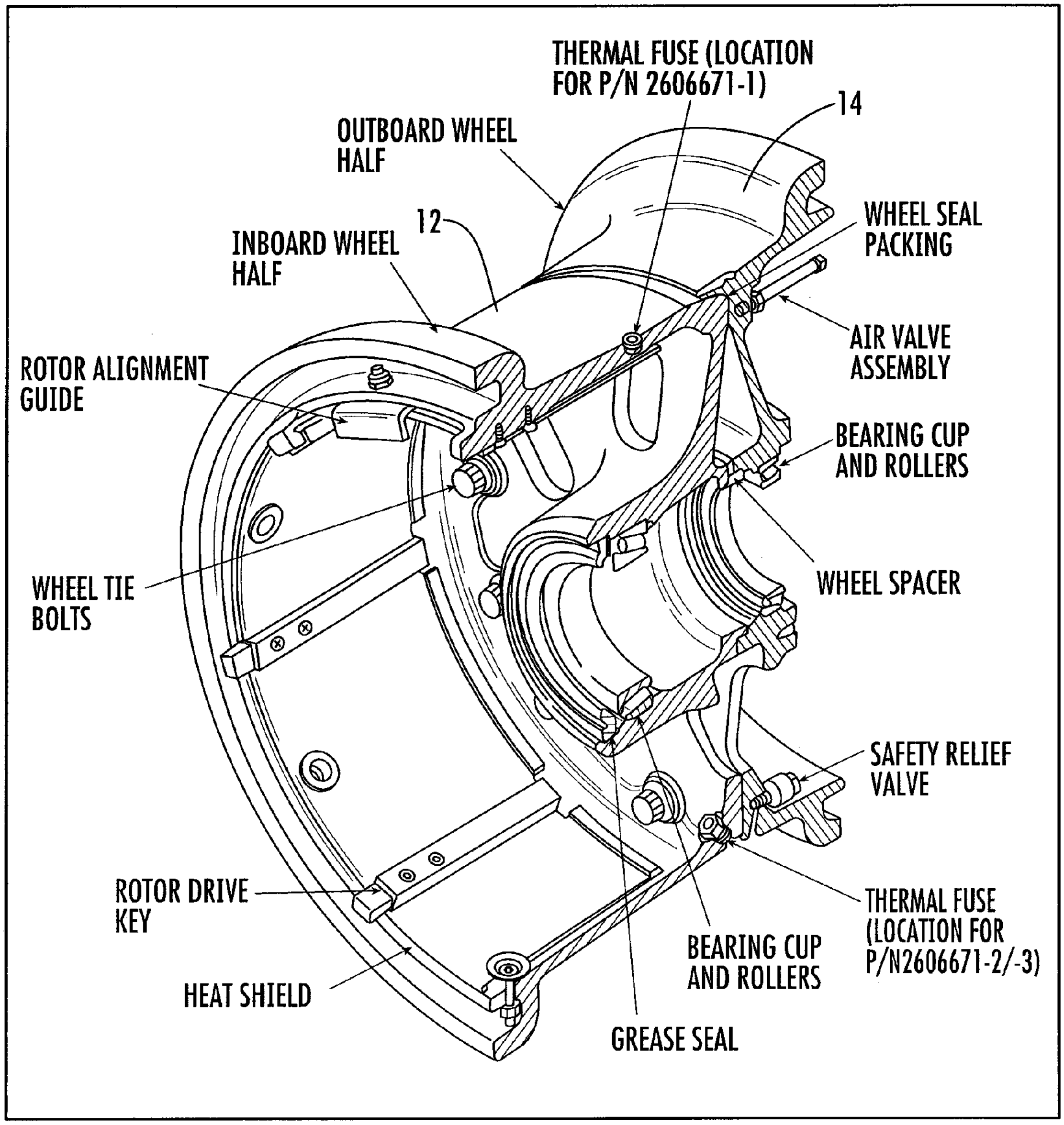
FIG. 6 (PRIOR ART)
FIG. 6 is a section view taken along lines 6-6 of FIG. 5.

Referring to FIGS. 3 and 4, the inner half 12 and outer half 14 of a wheel 10 are illustrated with the manufacturer's primer and topcoat specifications. As illustrated, the inner wheel half includes surfaces that require no paint designated by the indicator 1. Surfaces that require primer only indicated by the designator 2. Surfaces where overspray of primer and topcoat are allowed designated by the indicator 3. The remaining surfaces require primer and topcoat. As indicated by the illustrations, the paint requirements of an aircraft wheel are very specific. Also illustrated is the difficulty that would be encountered in utilizing tape to achieve the manufacturer's specifications.

Referring to FIGS. 5-8, one embodiment of an aircraft wheel 10 is illustrated. The aircraft wheel 10 includes an inner wheel half 12 and an outer wheel half 14. Bolts 16, washers 18 and nuts 20 hold the two wheel halves 12, 14 together while an o-ring 22 seals the joint between the two wheel halves. The inner wheel half 12 additionally includes drive lugs 24 or inserts 26 for the interaction with the brake assemblies, and may include heat shields 28 to reduce the transfer of brake heat to the wheel 10. An inner bore 30 extends through both halves of the wheel and is constructed and arranged to house at least two bearing and seal assemblies 32, and may further be constructed to include retaining rings, grease retainers or the like (not shown). In addition, either half of the wheel may include sensors 34, thermal relief plugs 36, over-inflation plugs 38, valve stem assembly 40, wheel weights 42 or the like that require ports 44 or bores that extend through the thickness of the wheel.

Figure 7:
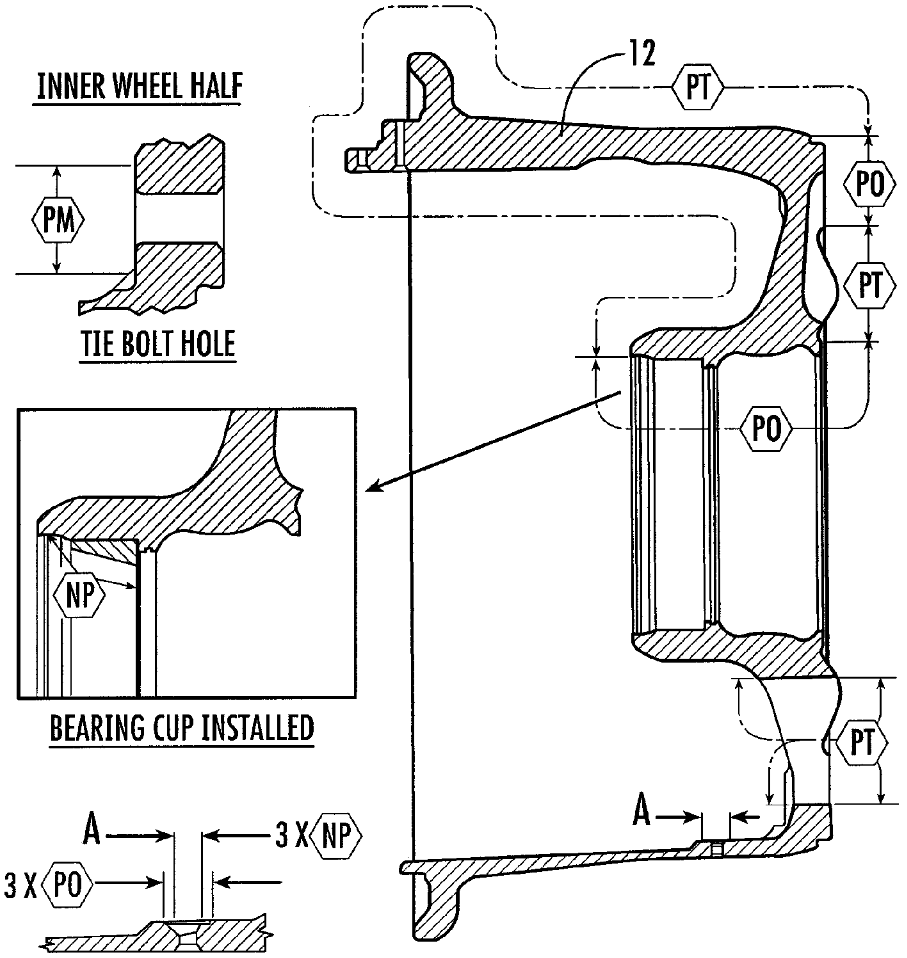
FIG. 7 (PRIOR ART)
FIG. 7 is a partial section view taken along lines 6-6 of FIG. 5.
Figure 8:
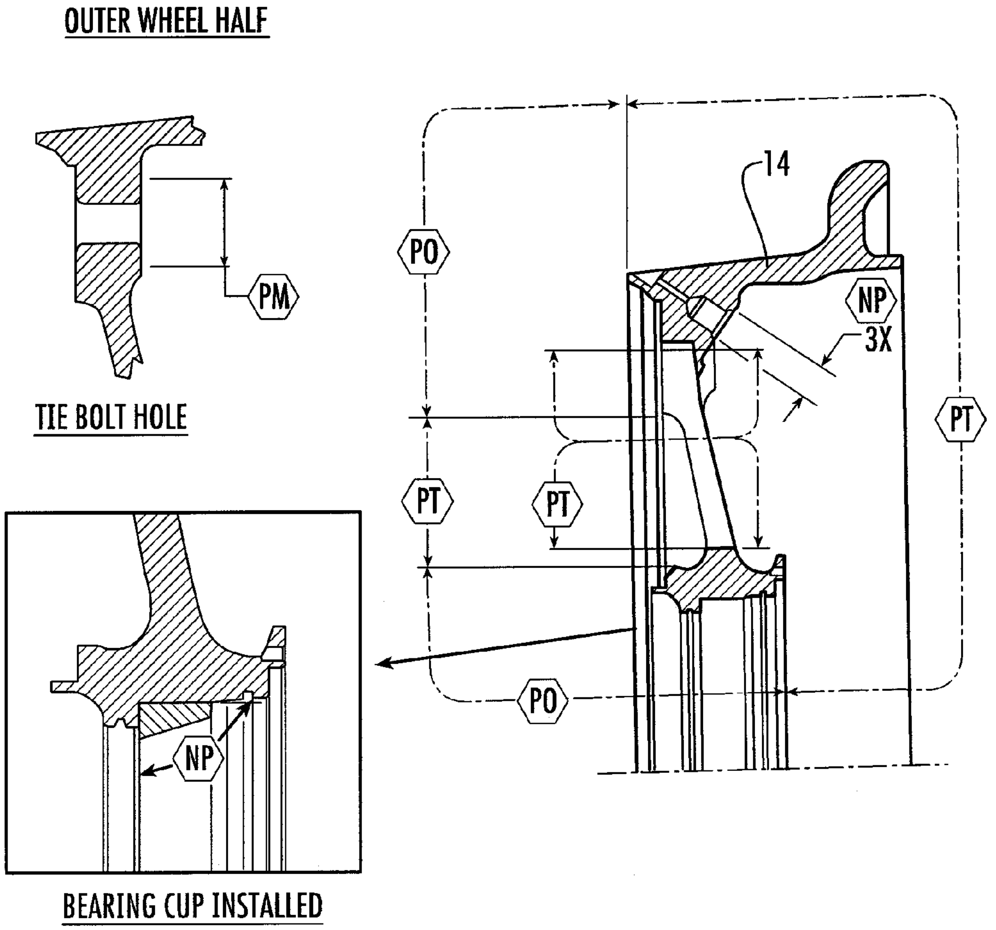
FIG. 8 (PRIOR ART)
FIG. 8 is a partial section view taken along lines 6-6 of FIG. 5.

Referring to FIGS. 7 and 8, the inner half 12 and outer half 14 of a wheel 10 are illustrated with the manufacturer's primer and topcoat specifications. As illustrated, the inner wheel half includes surfaces that require no paint designated by the indicator 1. Surfaces that require primer only indicated by the designator 2. Surfaces where overspray of primer and topcoat are allowed designated by the indicator 3. The remaining surfaces require primer and topcoat. As indicated by the illustrations, the paint requirements of an aircraft wheel are very specific. Also illustrated is the difficulty that would be encountered in utilizing tape to achieve the manufacturer's specifications.

Figure 9:
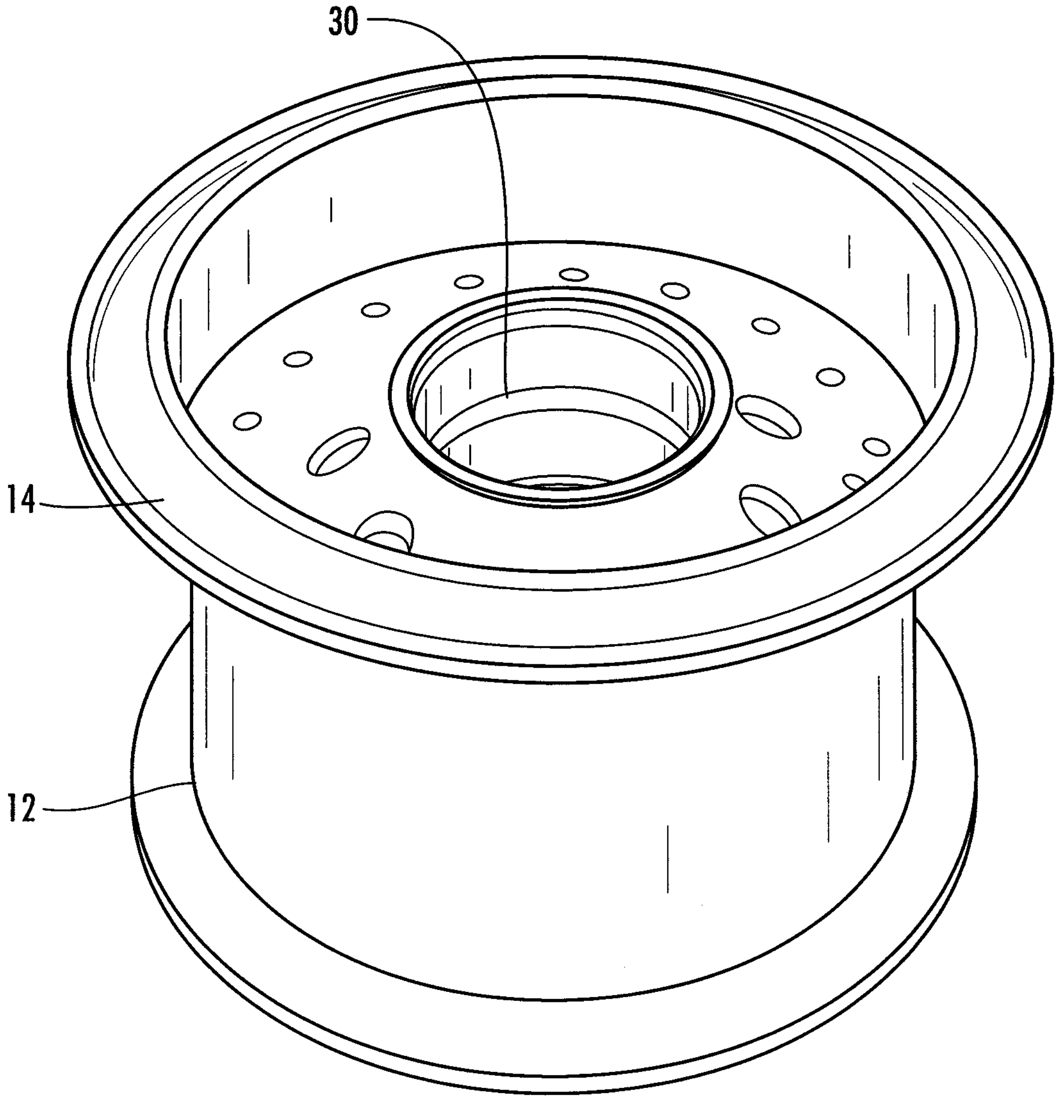
FIG. 9 (PRIOR ART)
FIG. 9 is a perspective view of one embodiment of an aircraft wheel.
Figure 10:
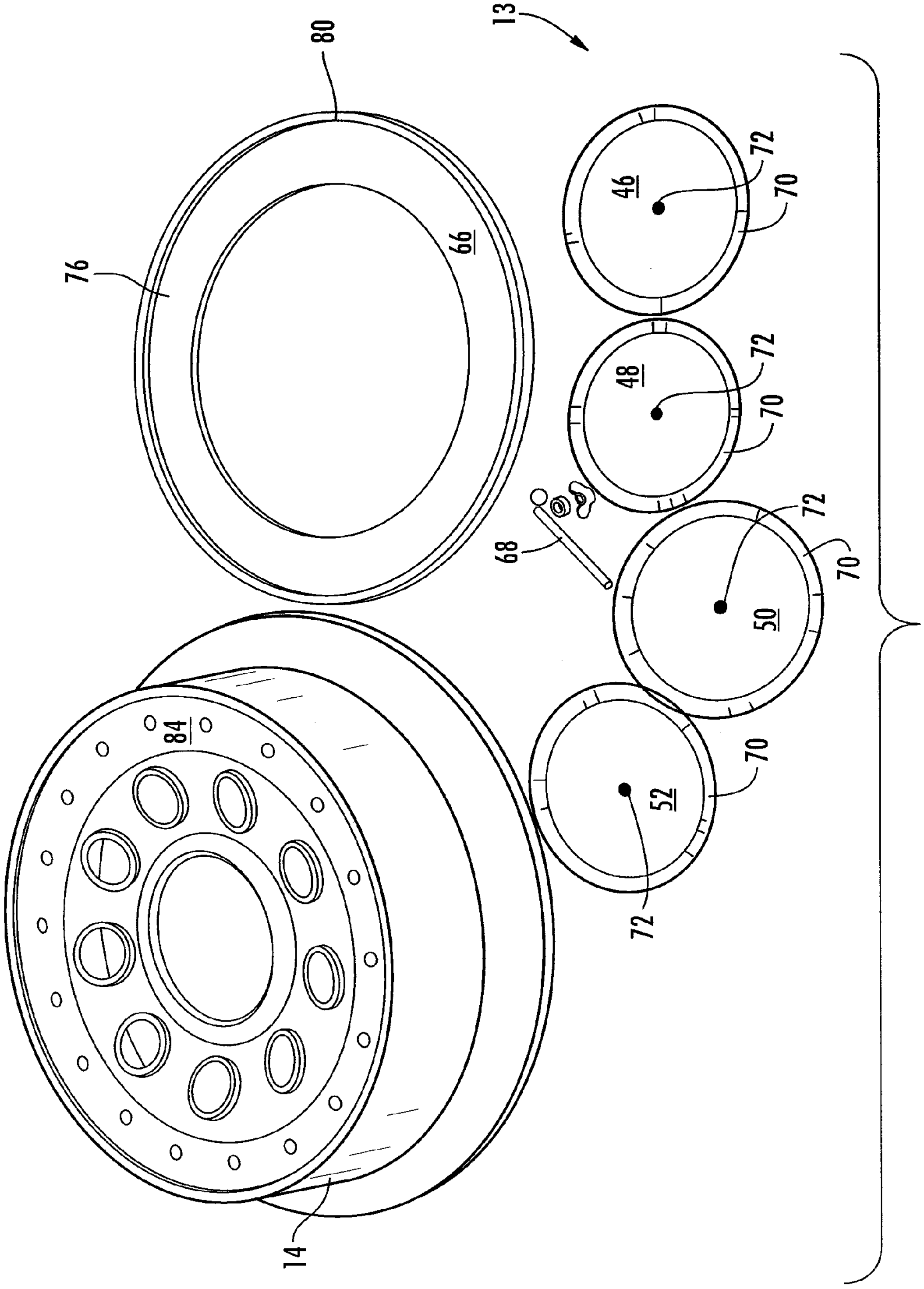
FIG. 10 is a perspective view of the outer half of the aircraft wheel shown in FIG. 9, illustrating a masking kit.

Referring to FIG. 9, an aircraft wheel prepped for repainting is illustrated. The wheel includes an inner half 12 and an outer half 14. Each of the inner and outer halves includes a portion of the inner bore.

Figure 11:
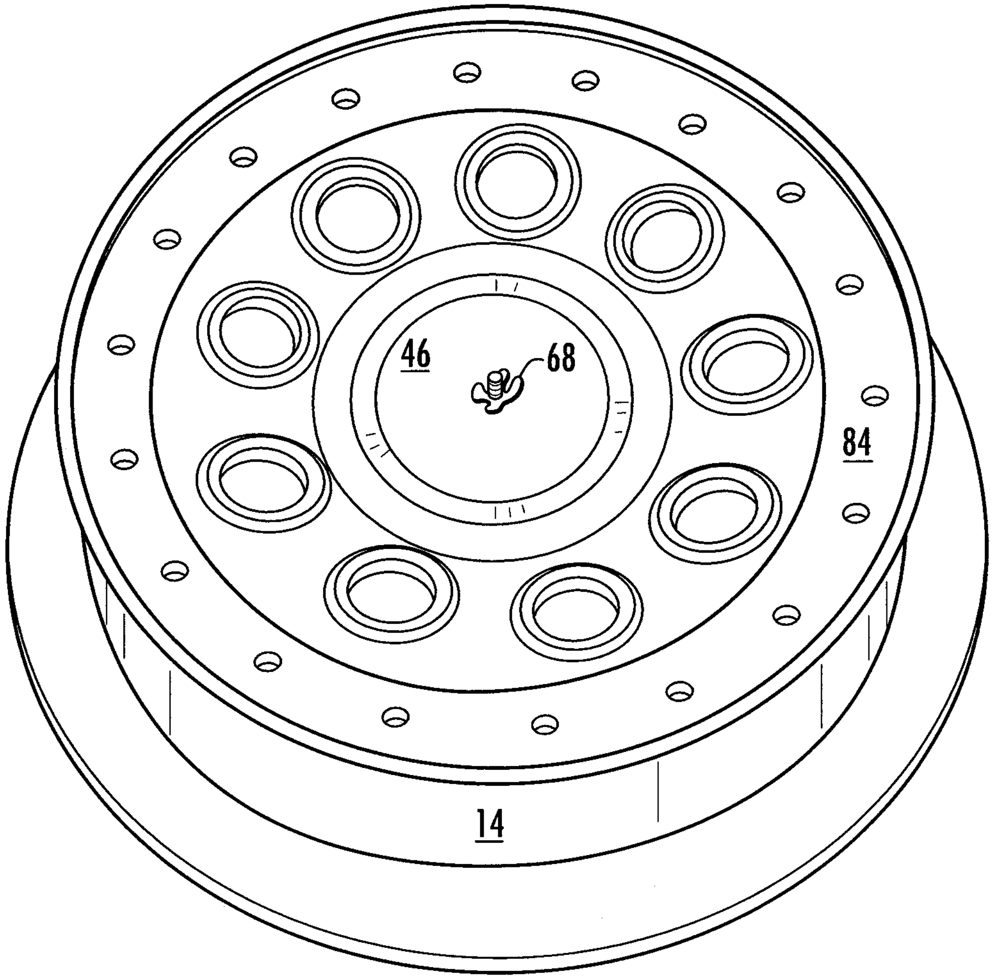
FIG. 11 is a perspective view of the outer half of the aircraft wheel shown in FIG. 10, illustrated with the first bearing cup masking element in place.
Figure 12:
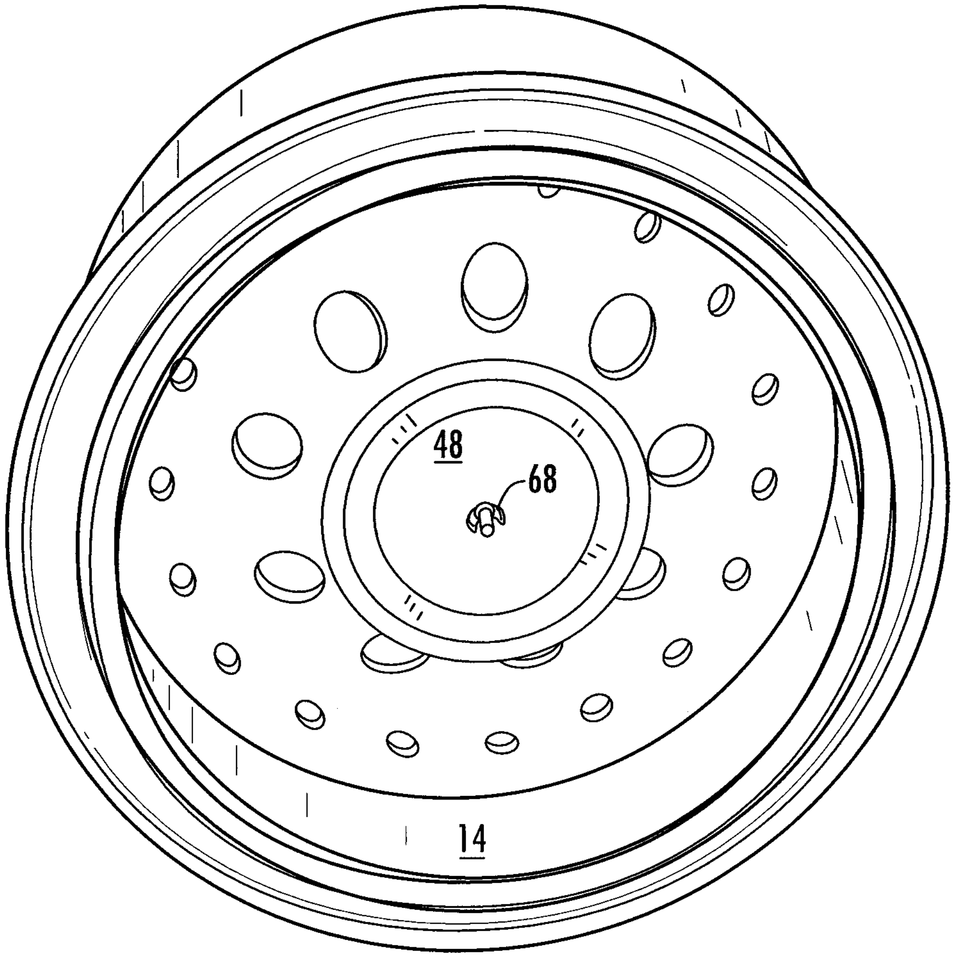
FIG. 12 is a perspective view of the outer half of the aircraft wheel shown in FIG. 10, illustrated with the second bearing cup masking element in place.

Referring to FIGS. 10-14, the outer portion of the aircraft wheel shown in FIG. 9 is shown, illustrating one embodiment of an outer wheel half masking kit 13 of the present invention. The masking kit for the outer half 14 of an aircraft wheel 10 generally includes a first bearing cup masking element 46, a second bearing cup masking element 48, a first inner bore masking element 50, a second inner bore masking element 52, a packing surface masking element 66 and a tie rod assembly 68. The first and second bearing cup masking elements are substantially round flat discs in shape having beveled edges 70 and a centrally located aperture 72. The first and second bearing cup masking elements are sized to fit snugly into the inner bore so that a side surface of the masking elements sets against the bearing cup (race) while the beveled edge 70 faces away from the bearing cup to allow primer to be applied to the inner bore of the wheel half right up to the edge of the bearing cup. The central aperture 72 is sized for cooperation with the tie rod assembly to hold the bearing cup masking elements in place within the inner bore 30 as illustrated in FIGS. 11 and 12. Typically, in use, the wheel half would be spray coated with a primer at this stage of the wheel recoating.

Figure 13:
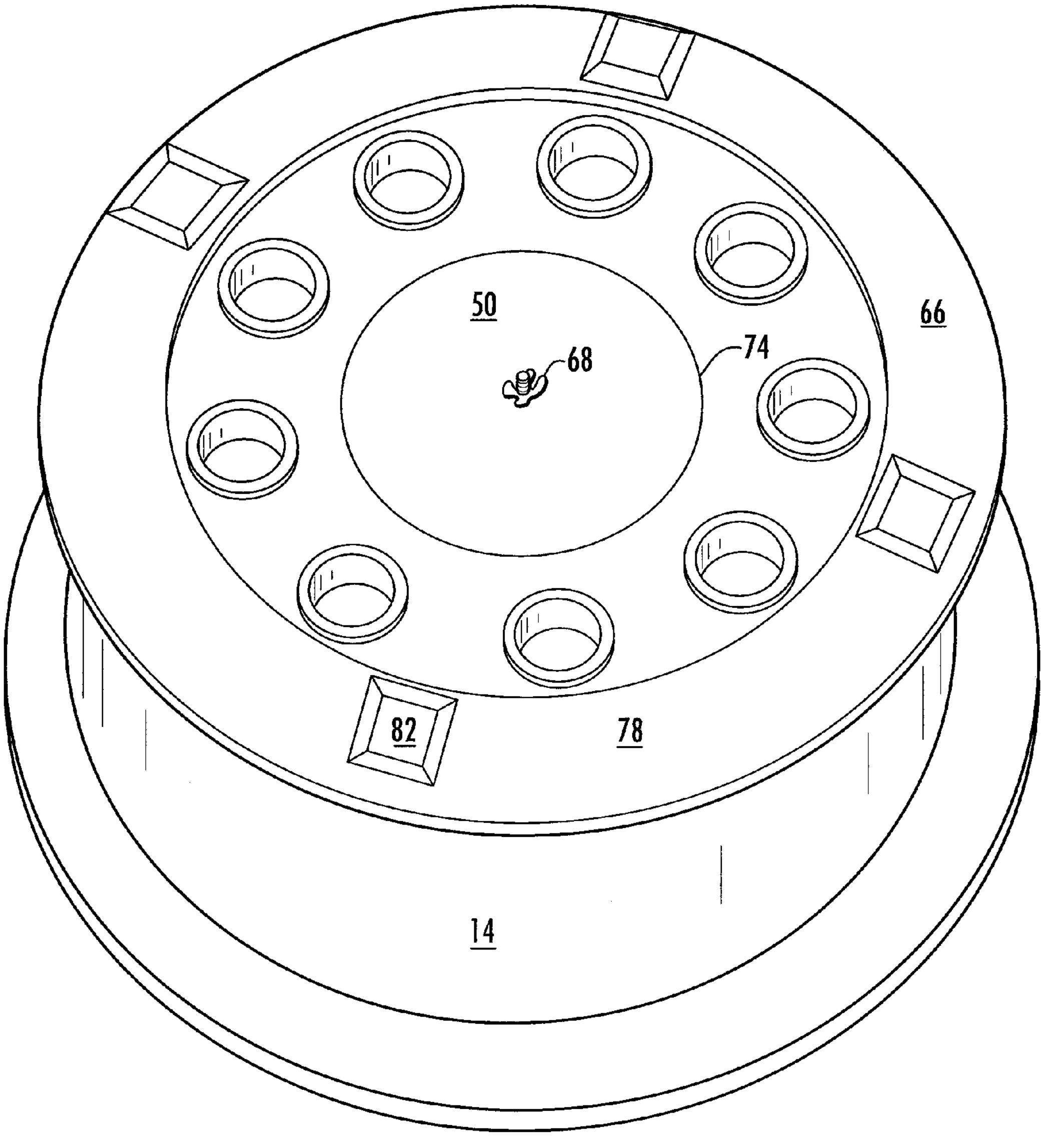
FIG. 13 is a perspective view of the outer half of the aircraft wheel shown in FIG. 10, illustrated with the wheel packing masking element in place.
Figure 14:
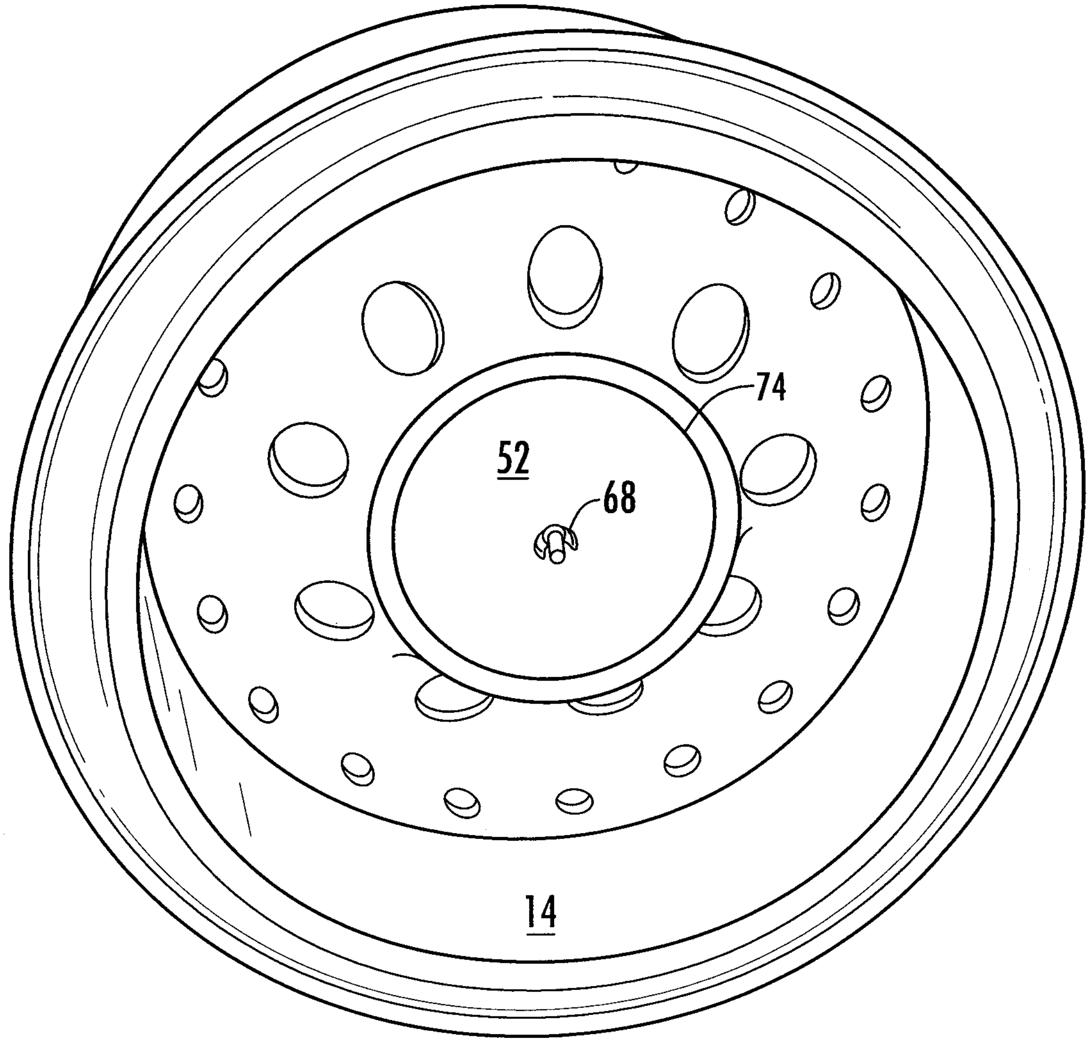
FIG. 14 is a perspective view of the outer half of the aircraft wheel shown in FIG. 10, illustrated with the inner bore masking element in place.
Figure 15:
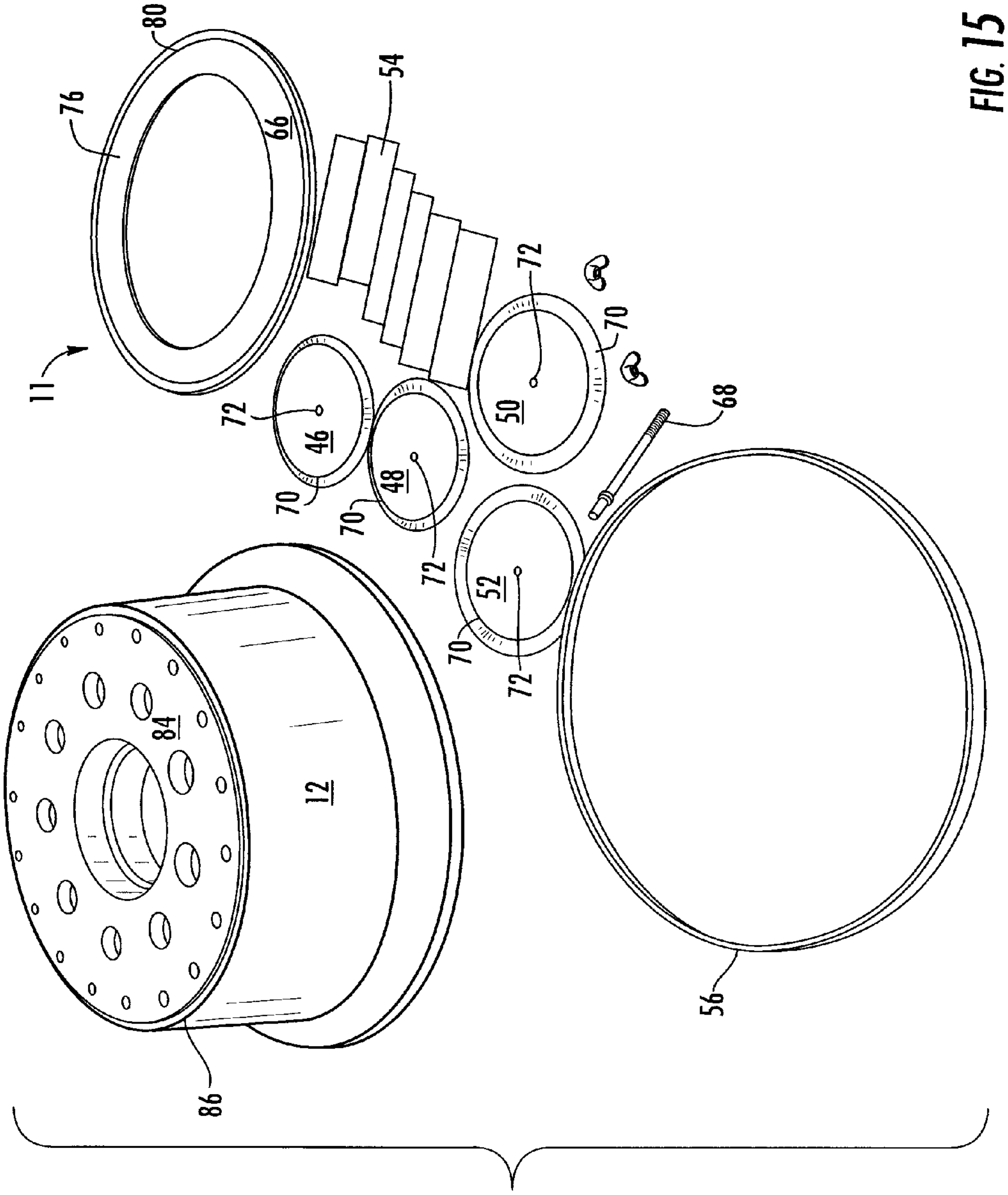
FIG. 15 is a perspective view of the inner half of the aircraft wheel shown in FIG. 9, illustrated with one embodiment of the masking kit of the present invention.

Referring to FIGS. 13 and 14, installation of the inner bore masking elements 50, 52 and wheel packing surface masking element 66 are illustrated. The inner bore masking elements are generally disc shaped having a beveled outer perimeter edge 70 and a central aperture 72. The inner bore masking elements 50, 52 are typically slightly larger in diameter than the bearing cup masking elements 46, 48. The inner bore masking elements are constructed and arranged for placement into the inner bore having the beveled edges facing inward so that the outer edge 74 falls proximate to the topcoat paint requirements of the manufacturer. This location is generally close to the edge of the inner bore. The edge provides a suitable contact line to prevent paint and/or overspray from traveling into the inner bore. The central aperture 72 is sized and located to cooperate with the tie bolt holding the bearing cup masking elements in place. This construction allows the inner bore masking elements to be added to the assembly without requiring removal of the bearing cup masking elements. The wheel packing masking element 66 includes an inner face 76 having contours 80 that substantially match the contour of the wheel packing surface 84 (FIG. 11) and feet 82 secured to outer surface 78. The contoured inner face 76 allows the wheel packing masking element to be snapped onto the wheel packing surface 84 without the need for fasteners or adhesives. Once attached, the packing surface side of the wheel can be painted with topcoat. The wheel can then be inverted for support by the feet 82, allowing the remaining portions of the wheel to be painted with topcoat. This eliminates a drying cycle that is typically required with the prior art. Once the topcoat layer has cured, the masking elements can be removed from the wheel half with tools for reuse. The masking elements are preferably constructed from a polymeric material such as plastic. In a most preferred embodiment, the masking elements are constructed from a high density polyethylene material (HDPE). This material has exhibited good temperature stability and overspray can be easily removed from surfaces after use. It should be noted that other materials may be utilized without departing from the scope of the invention. Such materials may include, but should not be limited to metals, woods, phenolics and suitable combinations thereof.

Figure 16:
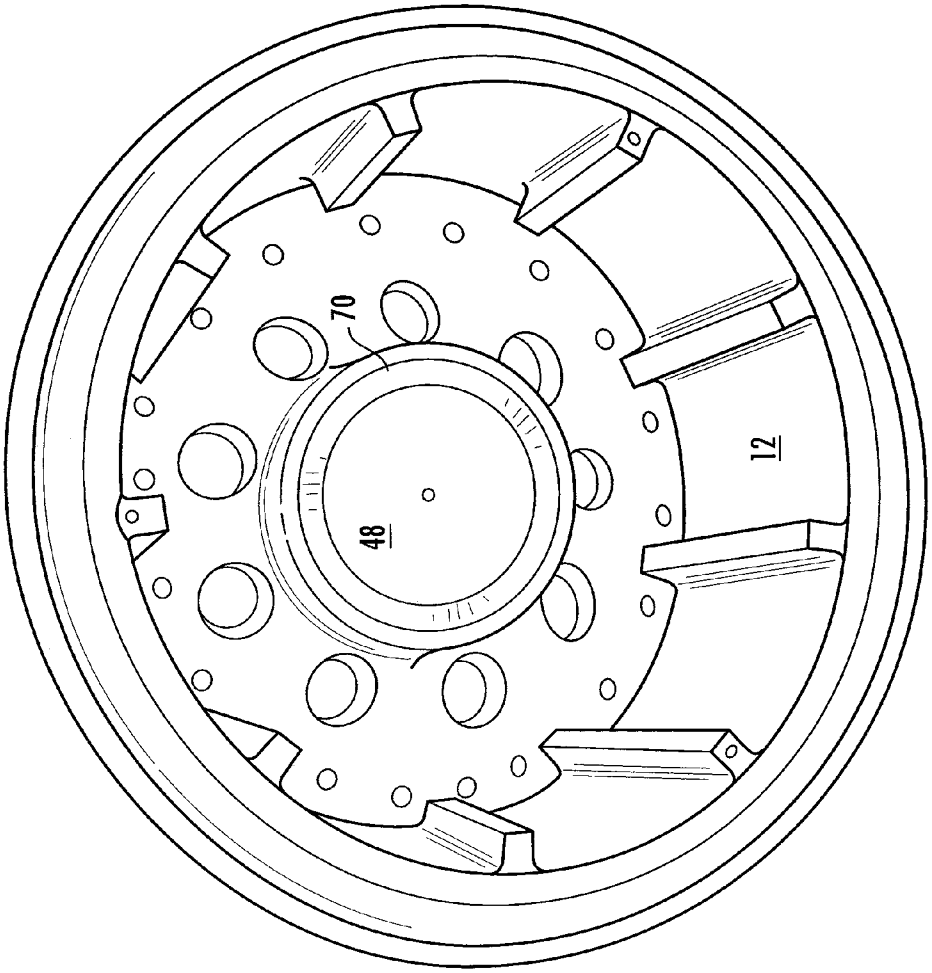
FIG. 16 is a perspective view of the inner half of the aircraft wheel shown in FIG. 15, illustrated with the first bearing cup masking element in place.
Figure 17:
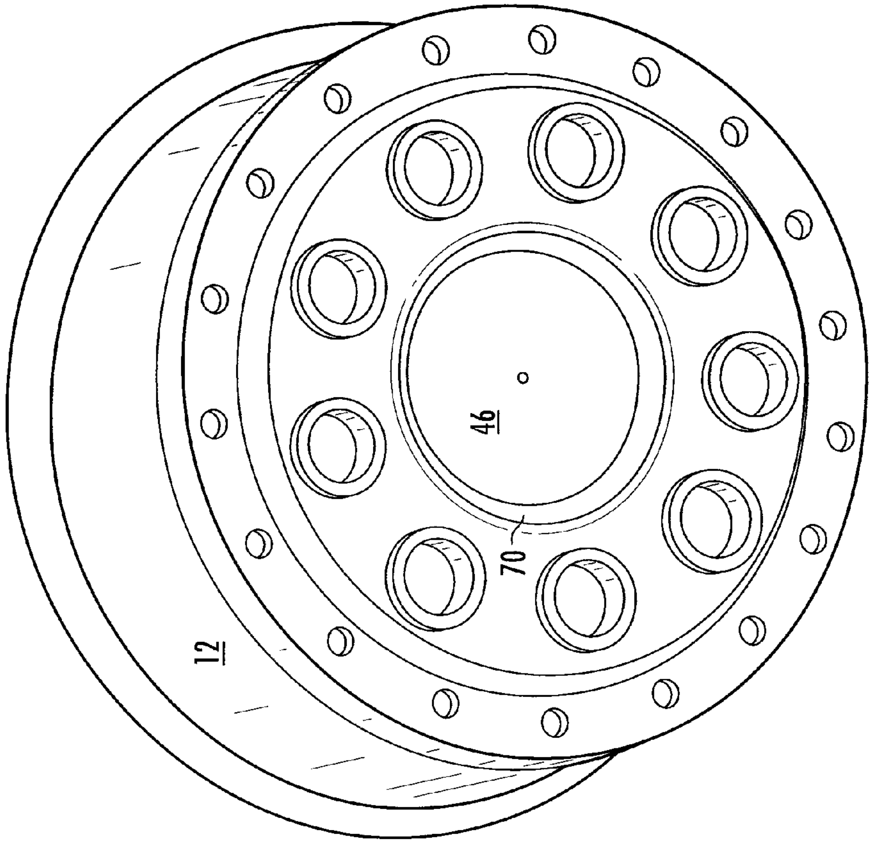
FIG. 17 is a perspective view of the inner half of the aircraft wheel shown in FIG. 15, illustrated with the second bearing cup masking element in place.
Figure 18:
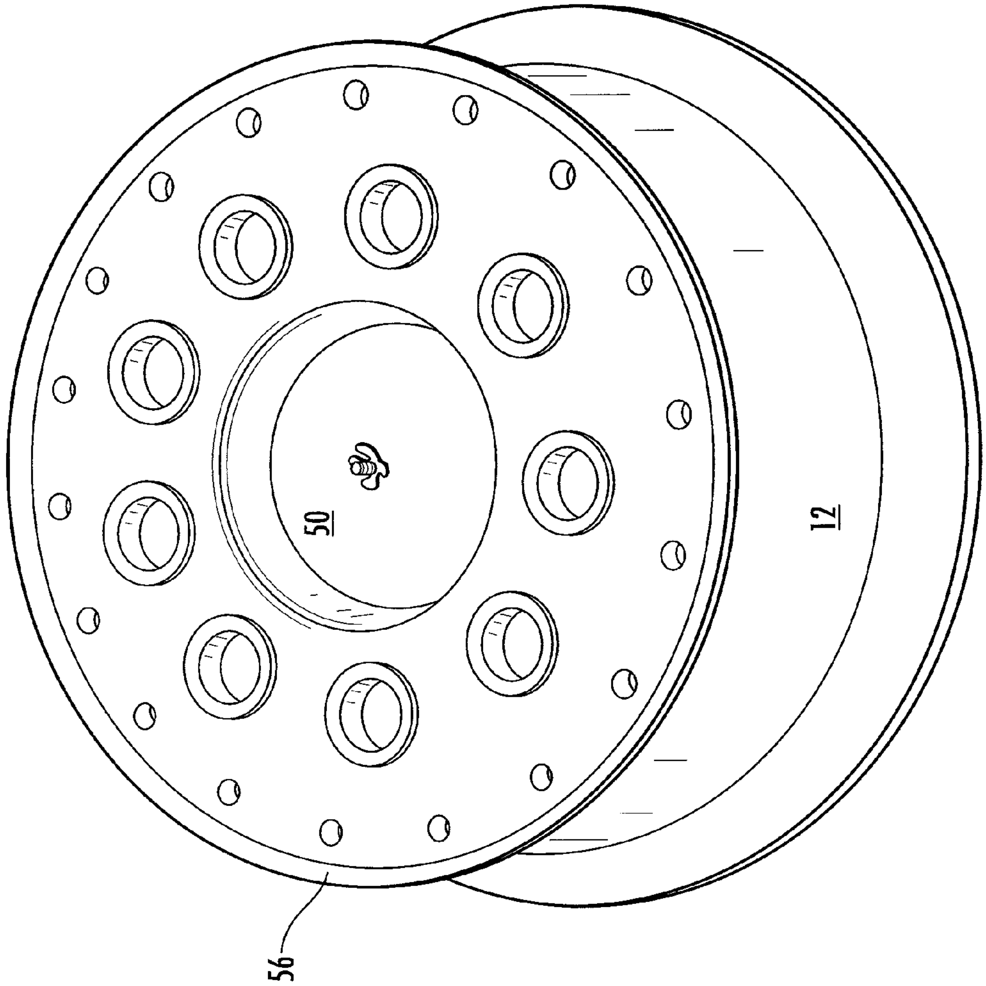
FIG. 18 is a perspective view of the inner half of the aircraft wheel shown in FIG. 15, illustrated with the first bearing cup masking element and packing groove masking element in place.
Figure 19:
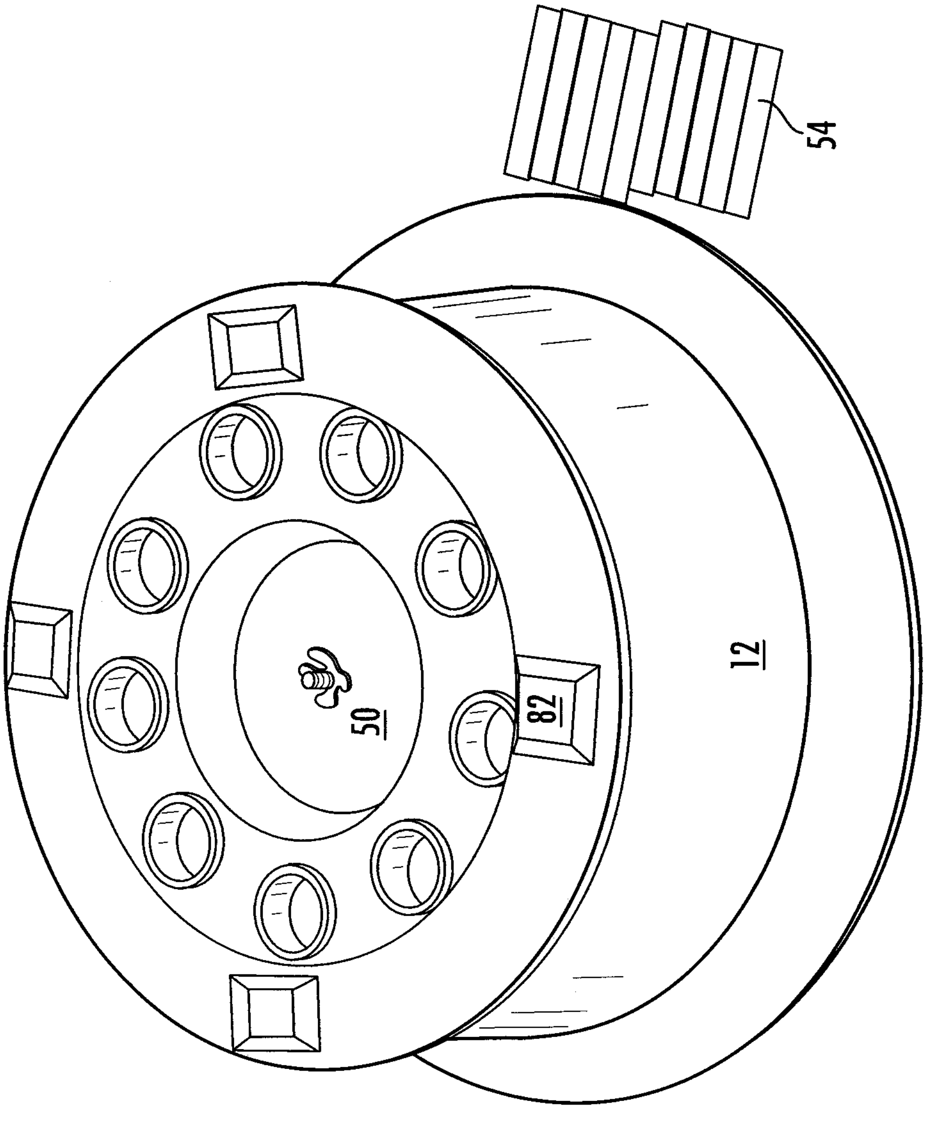
FIG. 19 is a perspective view of the inner half of the aircraft wheel shown in FIG. 15, illustrated with the first bearing cup masking element, packing groove masking element and packing surface masking element in place.
Figure 20:
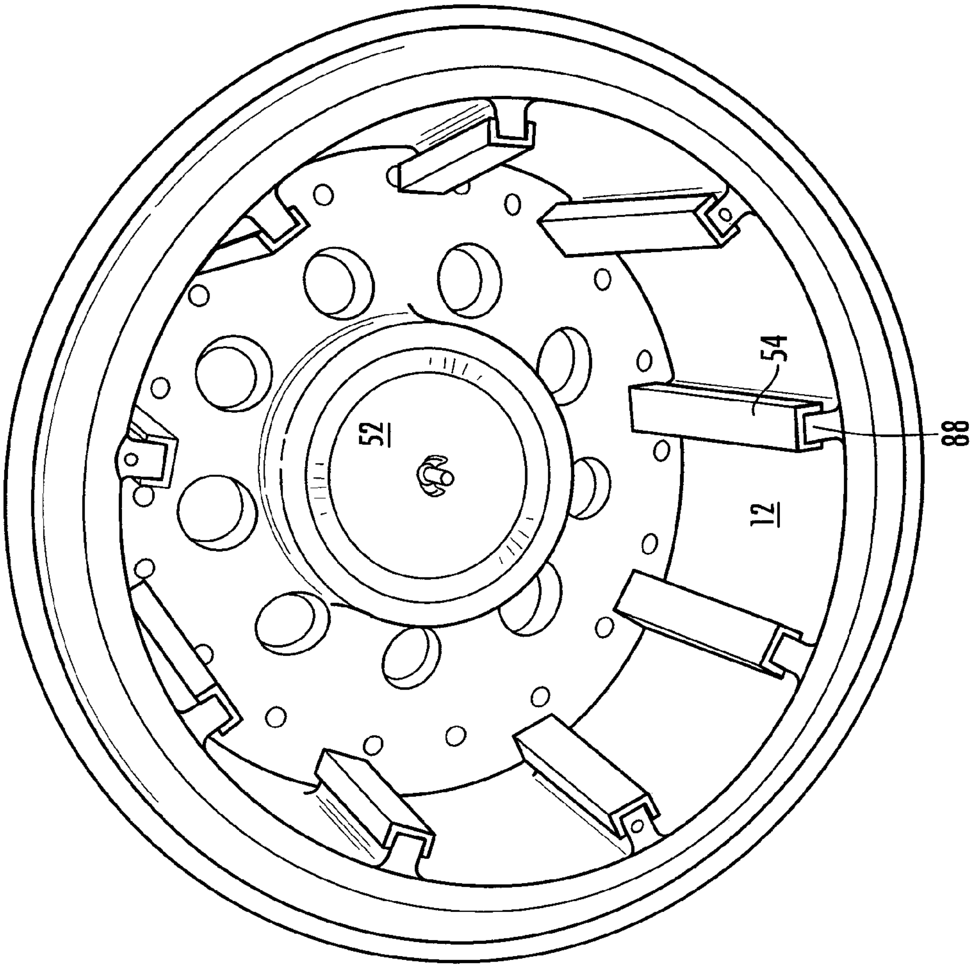
FIG. 20 is a perspective view of the inner half of the aircraft wheel shown in FIG. 15, illustrated with the second wheel bore masking element and drive lug masking element in place.
Figure 21:
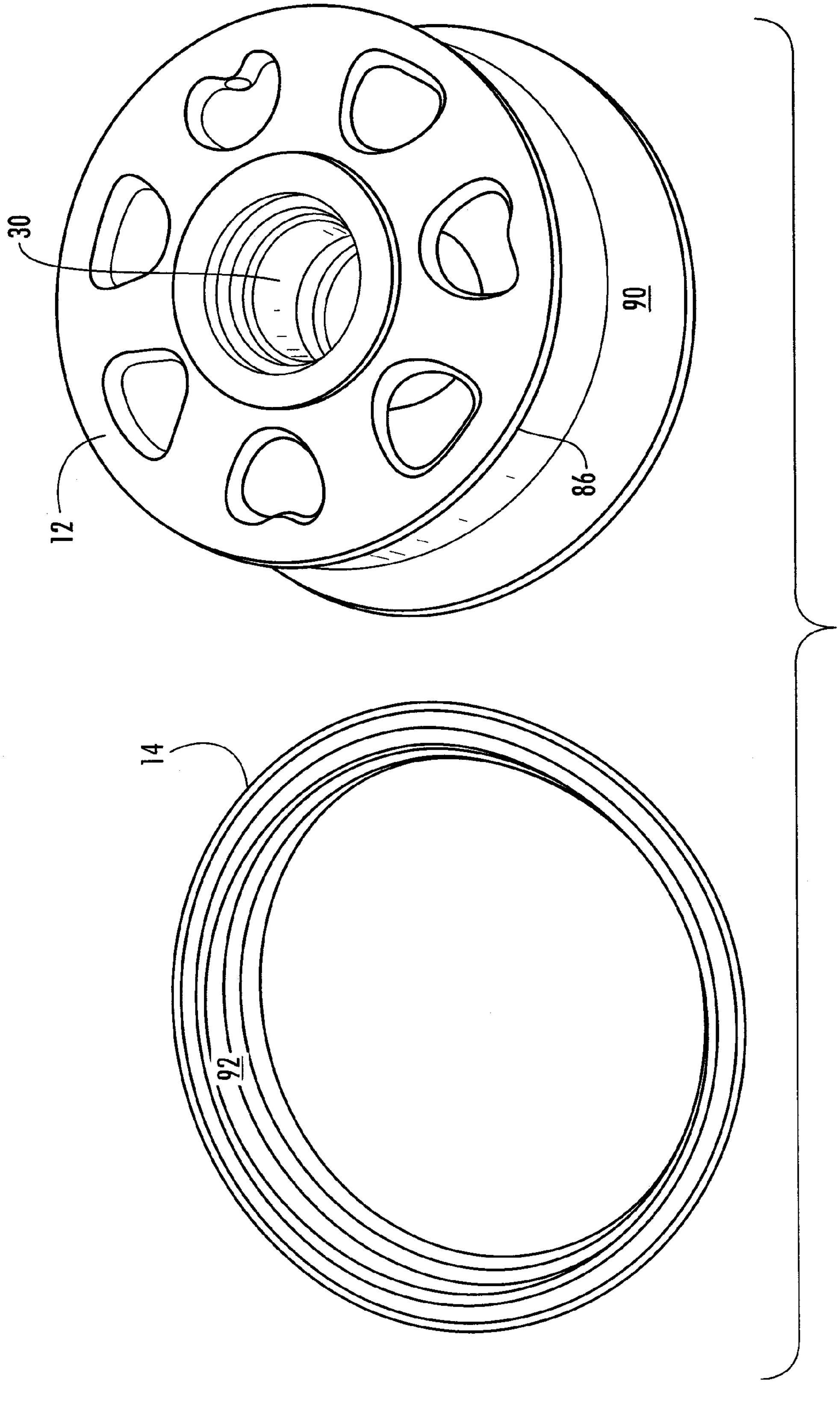
FIG. 21 is a perspective view of one embodiment of an aircraft wheel, illustrating a wheel having an inner portion and an outer slip ring.
Figure 22:
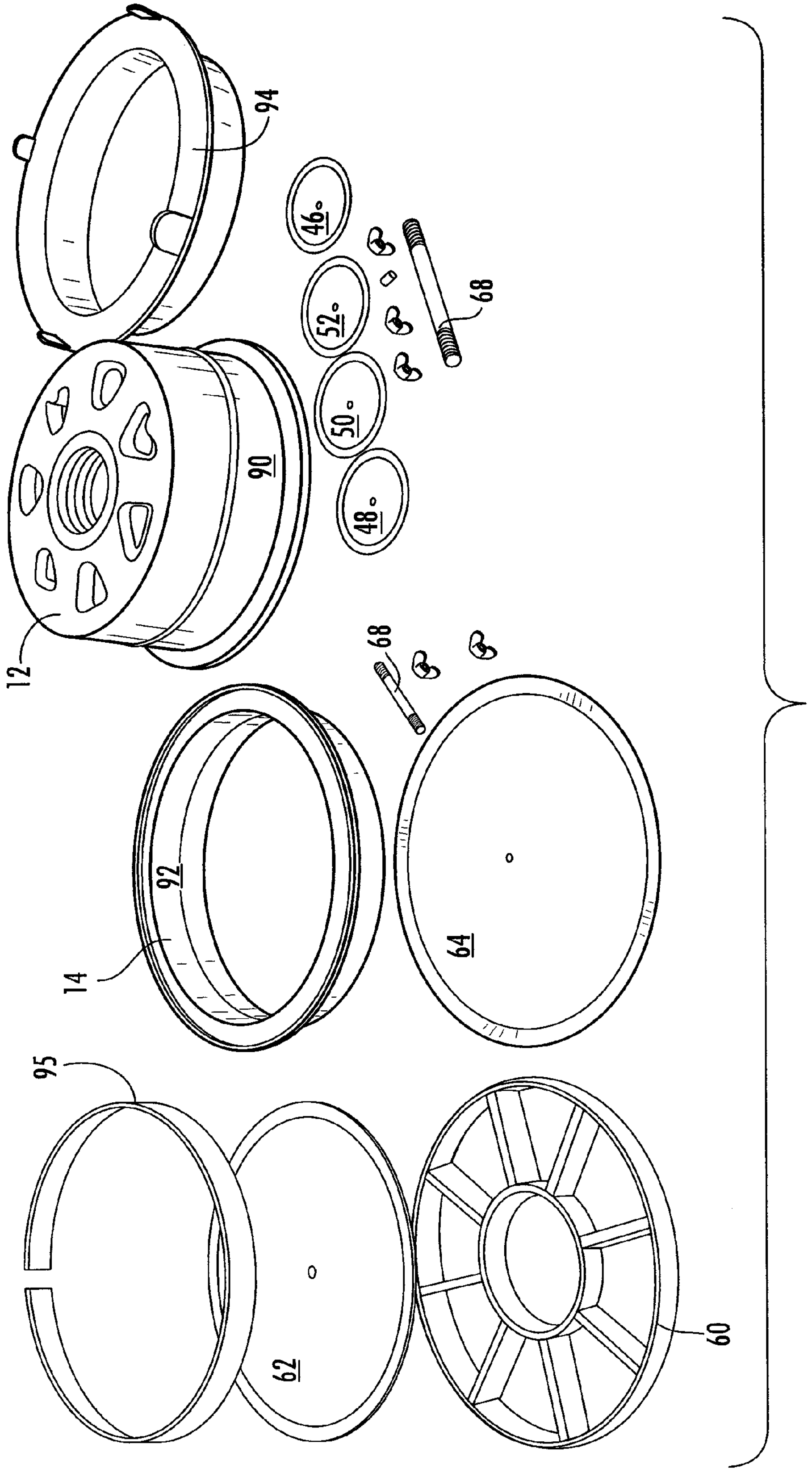
FIG. 22 is a perspective view of the aircraft wheel shown in FIG. 21, illustrated with one embodiment of the masking kit of the present invention.
Figure 23:
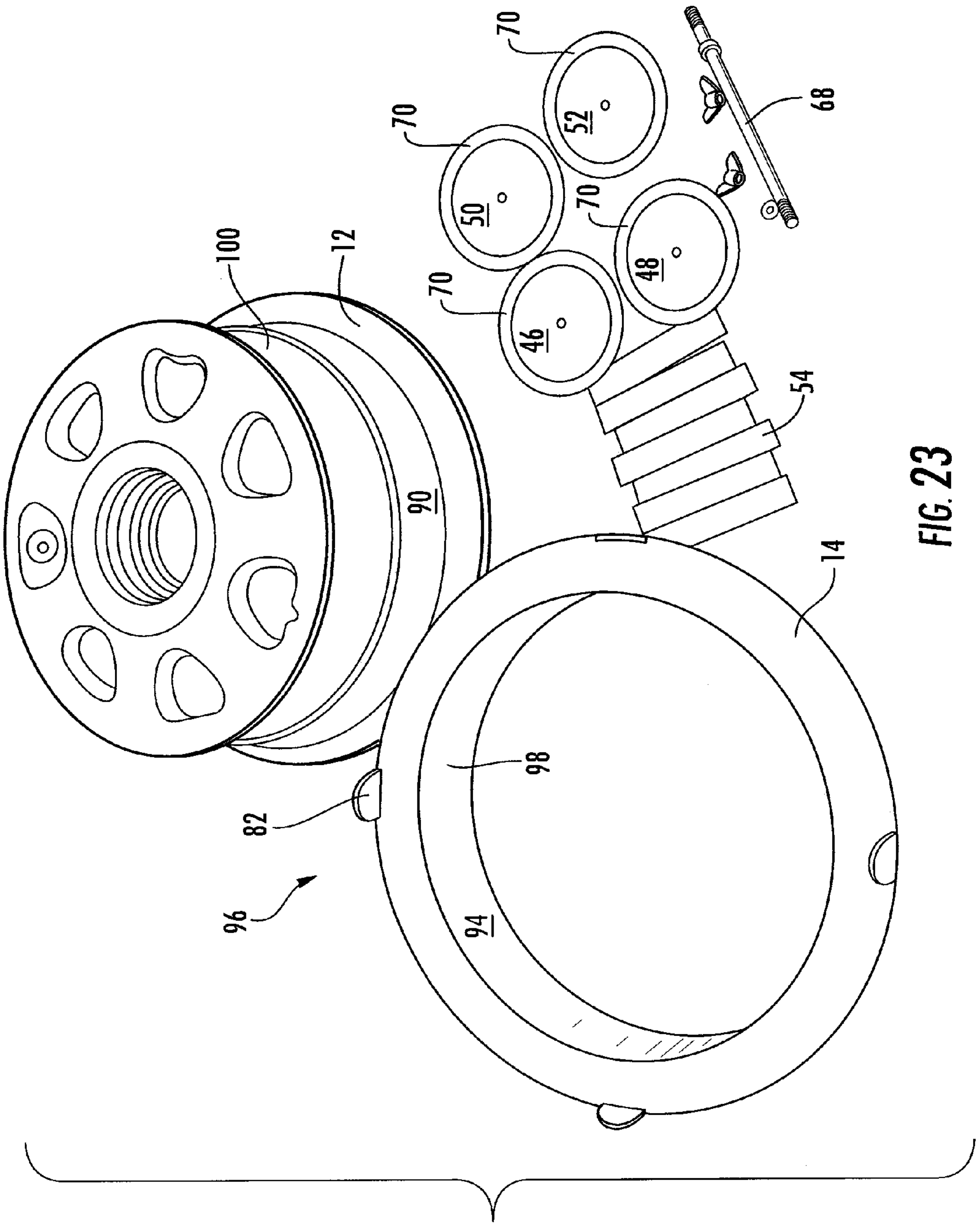
FIG. 23 is a perspective view of the inner portion of the aircraft wheel illustrated in FIG. 21 with one embodiment of the masking kit of the present invention.

Referring to FIGS. 15-20, an inner half of an aircraft wheel 12 is illustrated with one embodiment of an inner wheel masking kit 11. The inner wheel masking kit 11 generally includes a first bearing cup masking element 46, a second bearing cup masking element 48, a first inner bore masking element 50, a second inner bore masking element 52, a packing surface masking element 66, a packing groove masking element 86 and a tie rod assembly 68. The first and second bearing cup masking elements are substantially round flat discs in shape having beveled edges 70 and a centrally located aperture 72. The first and second bearing cup masking elements are sized to fit snugly into the inner bore so that a side surface of the masking elements sets against the bearing cup (race) while the beveled edge 70 faces away from the bearing cup to allow primer to be applied to the inner bore of the wheel half right up to the edge of the bearing cup. The central aperture 72 is sized for cooperation with the tie rod assembly 68 to hold the bearing cup masking elements in place within the inner bore 30 as illustrated in FIGS. 16 and 17. Typically, in use, the wheel half would be spray coated with a primer at this stage of the wheel recoating.

Referring to FIGS. 15, 18, 19 and 20, installation of the inner bore masking elements 50, 52, packing groove masking element 56, wheel packing masking element 66 and drive lug masking elements 54 are illustrated. The inner bore masking elements are generally disc shaped having a beveled outer perimeter edge 70 and a central aperture 72. The inner bore masking elements 50, 52 are typically slightly larger in diameter than the bearing cup masking elements 46, 48. The inner bore masking elements are constructed and arranged for placement into the inner bore having the beveled edges facing inward so that the outer edge 74 falls proximate to the topcoat paint requirements of the manufacturer. This location is generally close to the edge of the inner bore. The edge provides a suitable contact line to prevent paint and/or overspray from traveling into the inner bore. The central aperture 72 is sized and located to cooperate with the tie bolt holding the bearing cup masking elements in place. This construction allows the inner bore masking elements to be added to the assembly without requiring removal of the bearing cup masking elements. The packing groove masking element 56 is sized and shaped to cooperate with the wheel packing groove 86 in an interlocking manner. The wheel packing groove generally is constructed and arranged to contain an o-ring or similar sealing type packing element. The wheel packing masking element includes an inner face 76 having contours 80 that substantially match the contour of the wheel packing surface 84 and feet 82 secured to outer surface 78. The contoured inner face 76 allows the wheel packing masking element to be snapped onto the wheel packing surface 84 without the need for fasteners or adhesives, see FIG. 19. The drive lug masking elements 54 are generally elongated elements having a channel 88 sized for a slight interference fit with the drive lugs of the wheel half. This construction allows the drive lug masking elements to be snapped into place without adhesive or fasteners. Once attached, the packing surface side of the wheel can be painted with topcoat. The wheel can then be inverted for support by the feet 82, allowing the remaining portions of the wheel to be painted with topcoat. This eliminates a drying cycle that is typically required with the prior art. Once the topcoat layer has cured, the masking elements can be removed from the wheel half with tools for reuse. The masking elements are preferably constructed from a polymeric material such as plastic. In a most preferred embodiment, the masking elements are constructed from a high density polyethylene material (HDPE). This material has exhibited good temperature stability and overspray can be easily removed from surfaces after use. It should be noted that other materials may be utilized without departing from the scope of the invention. Such materials may include, but should not be limited to metals, woods, phenolics and suitable combinations thereof.

Referring to FIGS. 21-28, an alternative wheel design and masking kit are illustrated. In this construction the wheel 90 and inner bore 30 are constructed as a single piece. A slip ring 92 cooperates with the outer diameter of the wheel to provide an outer tire bead. A split ring 95 fits between the wheel 90 and the slip ring 92 to position the slip ring on the wheel. An o-ring or similar seal (not shown) cooperates with packing groove(s) 86 formed into the outer diameter of the wheel.

Figure 24:
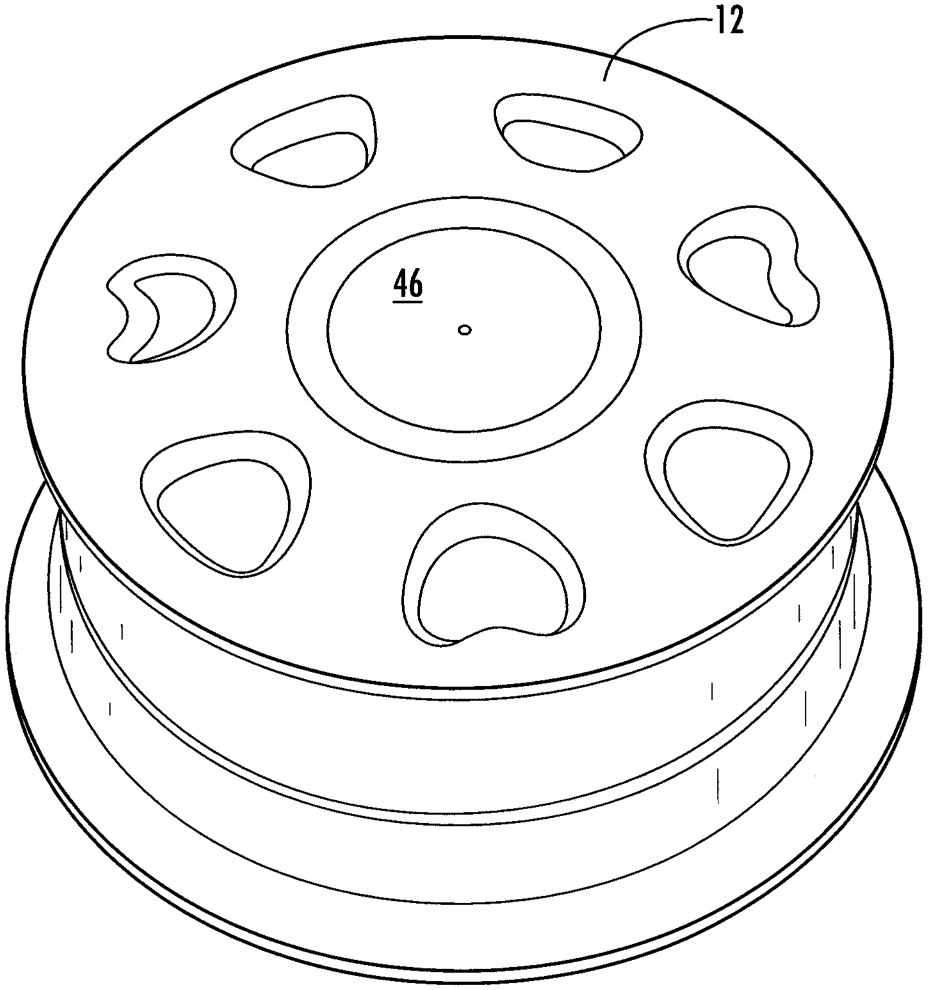
FIG. 24 is a perspective view of the inner portion of the aircraft wheel illustrated in FIG. 21 with the first bearing cup masking element in position.
Figure 25:
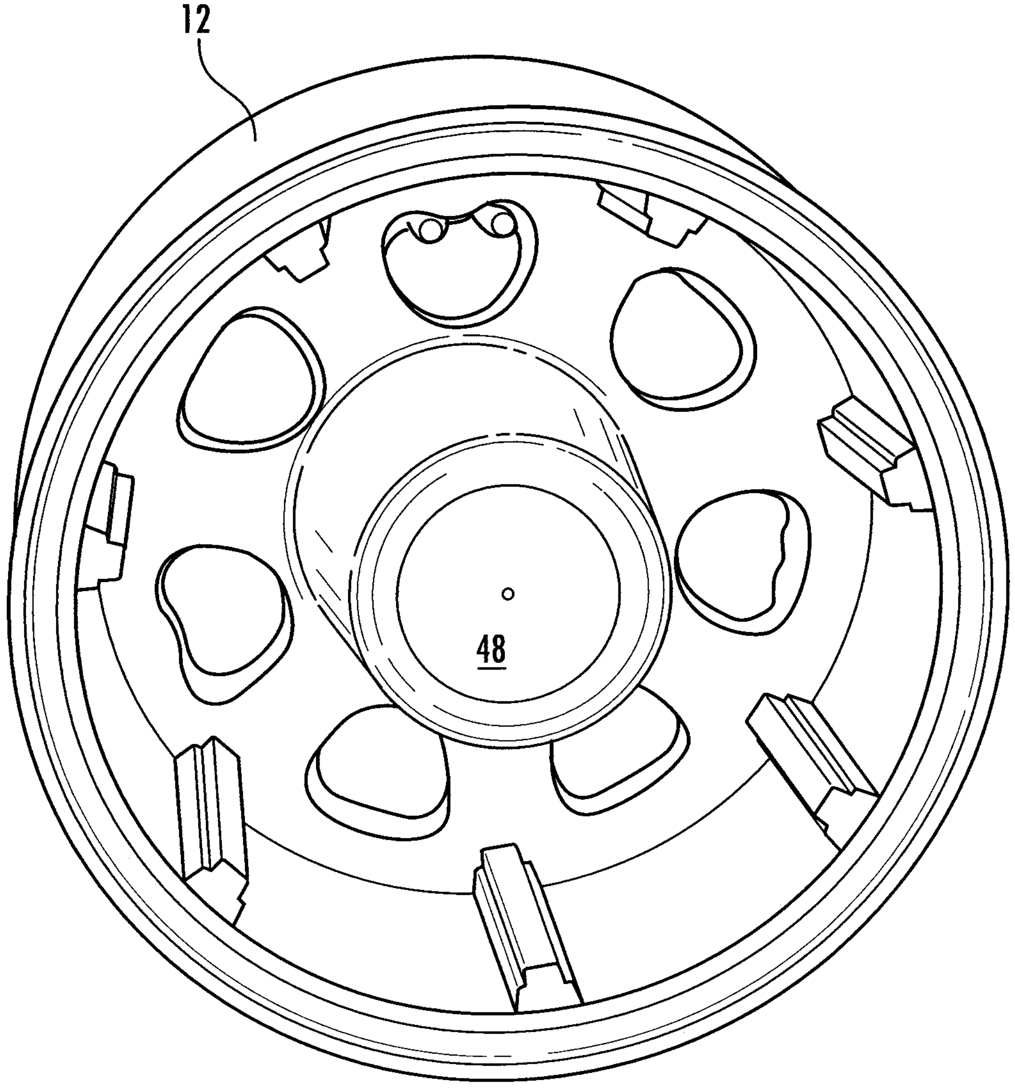
FIG. 25 is a perspective view of the inner portion of the aircraft wheel illustrated in FIG. 21 with the second bearing cup masking element in position.
Figure 26:
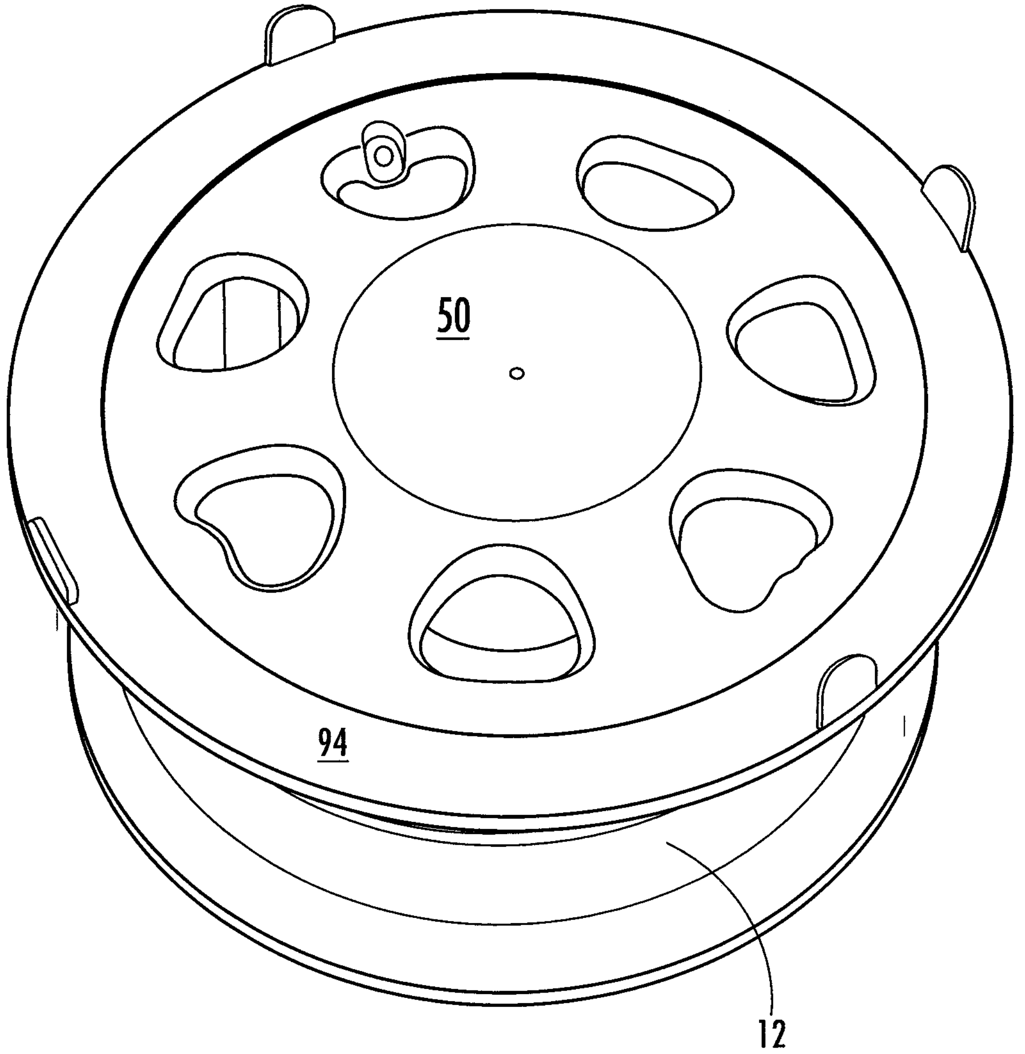
FIG. 26 is a perspective view of the inner portion of the aircraft wheel illustrated in FIG. 21 with the first inner bore masking element and slip ring masking element in position.
Figure 27:
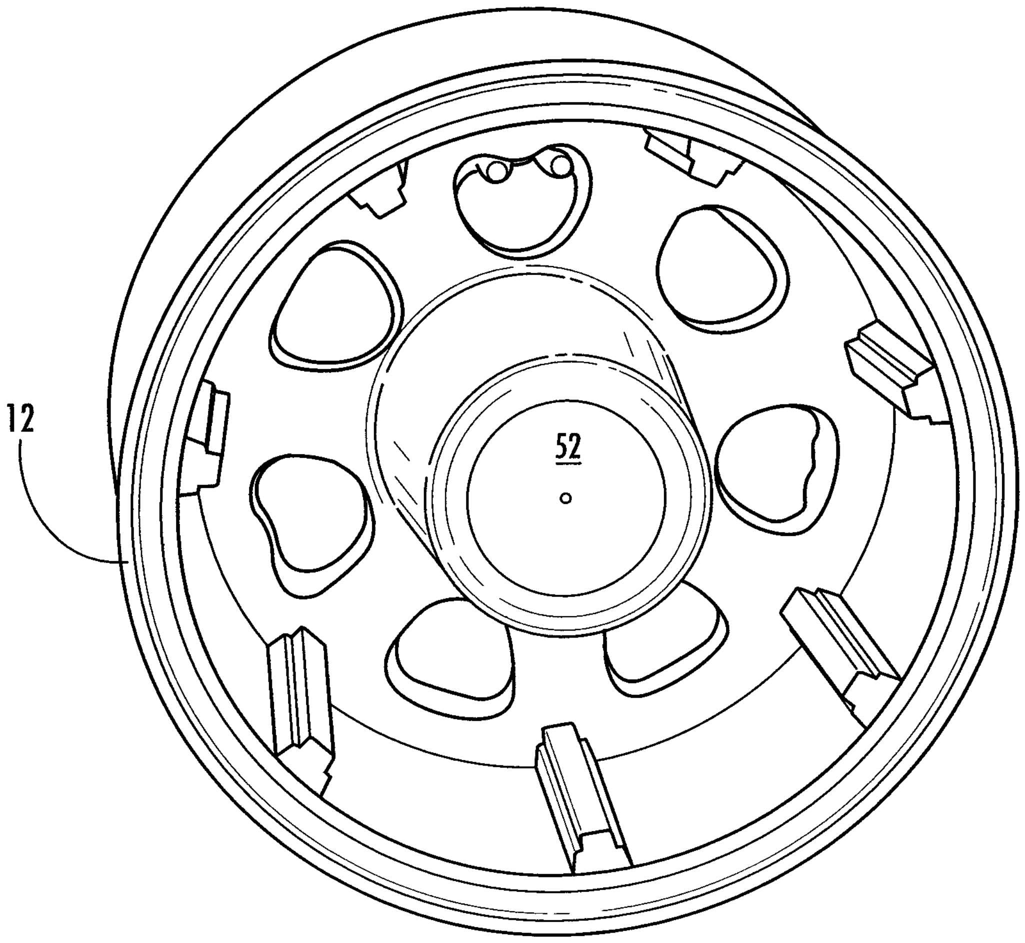
FIG. 27 is a perspective view of the inner portion of the aircraft wheel illustrated in FIG. 21 with the second inner bore masking element and slip ring masking element in position.
Figure 28:
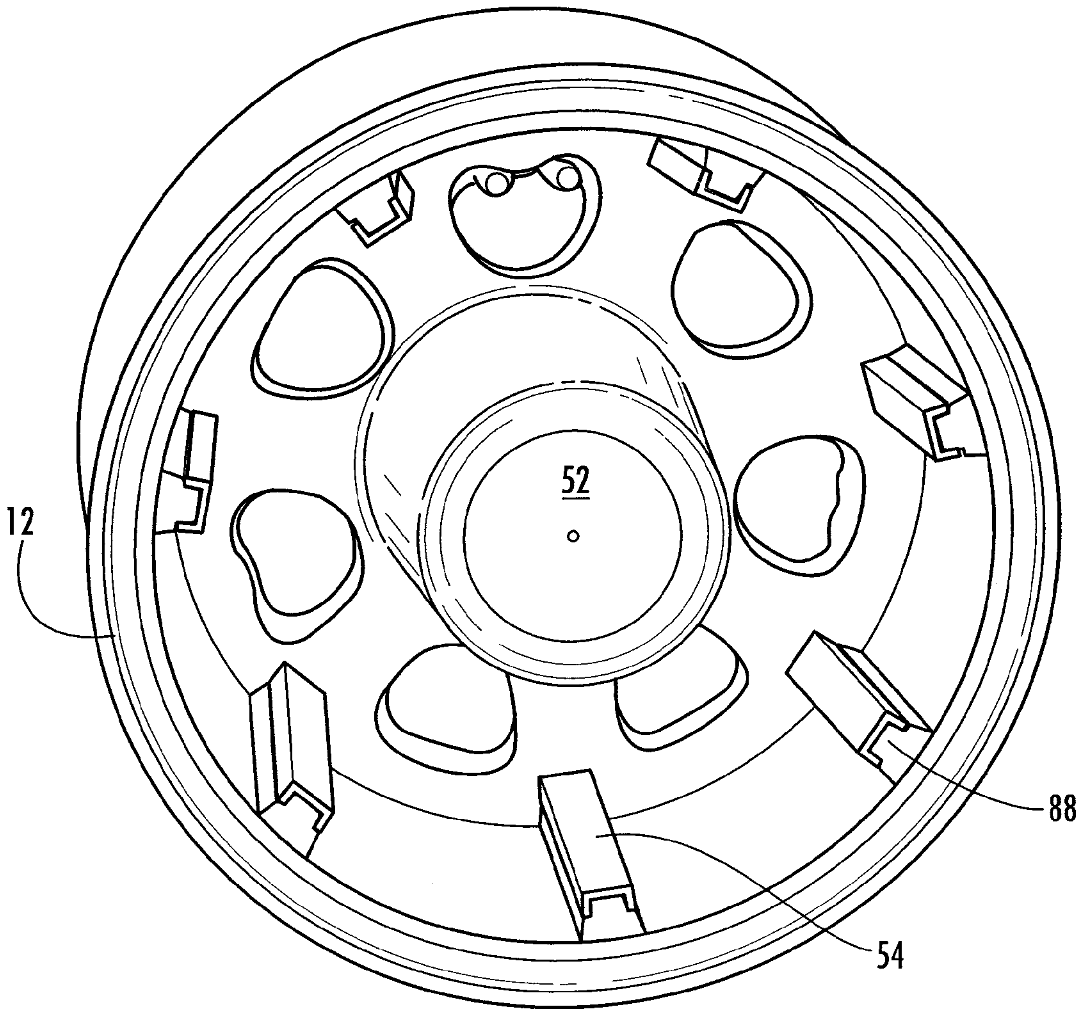
FIG. 28 is a perspective view of the inner portion of the aircraft wheel illustrated in FIG. 21 with the second inner bore masking element, slip ring masking element and drive lug masking elements in position.
Figure 29:
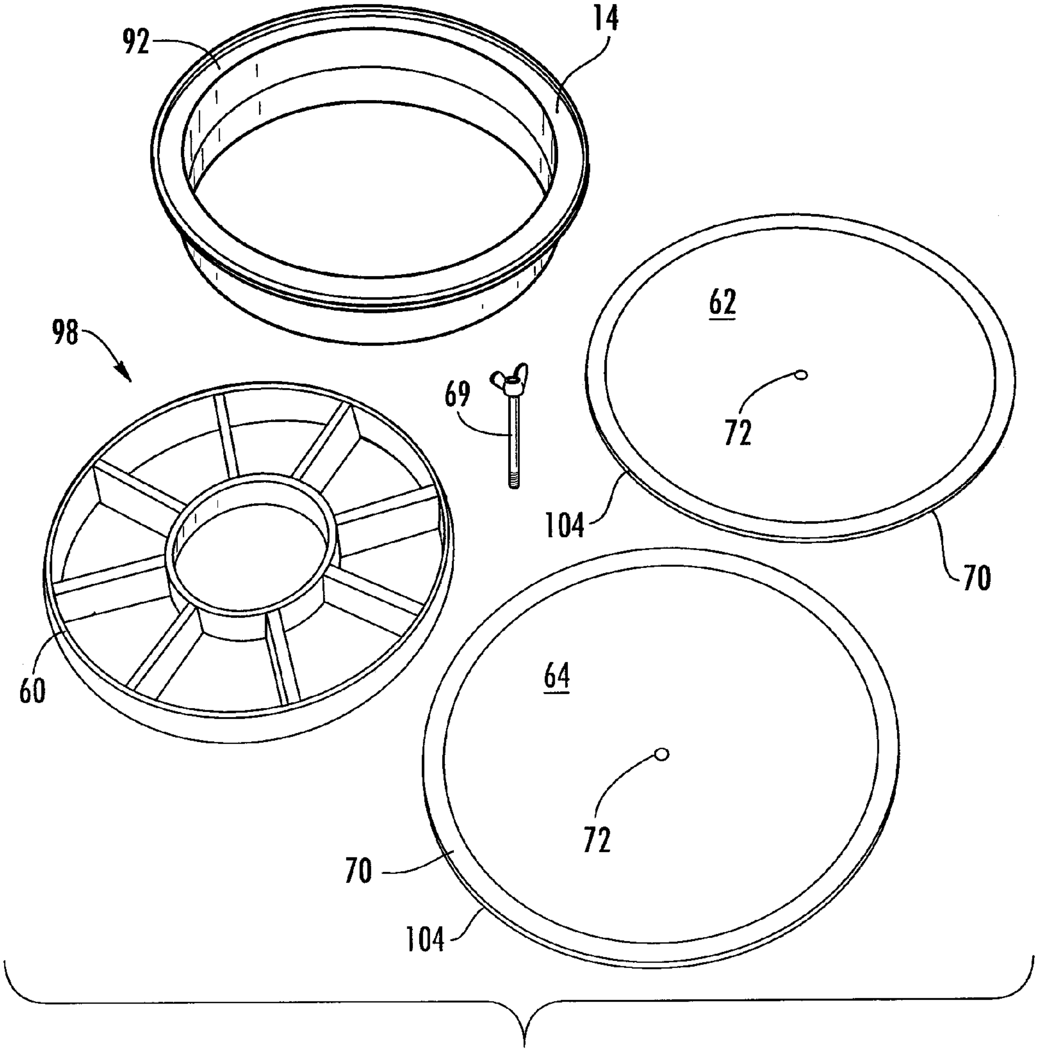
FIG. 29 is a perspective view of the slip ring portion of the aircraft wheel of FIG. 21, illustrated with one embodiment of the masking kit of the present invention.
Figure 30:
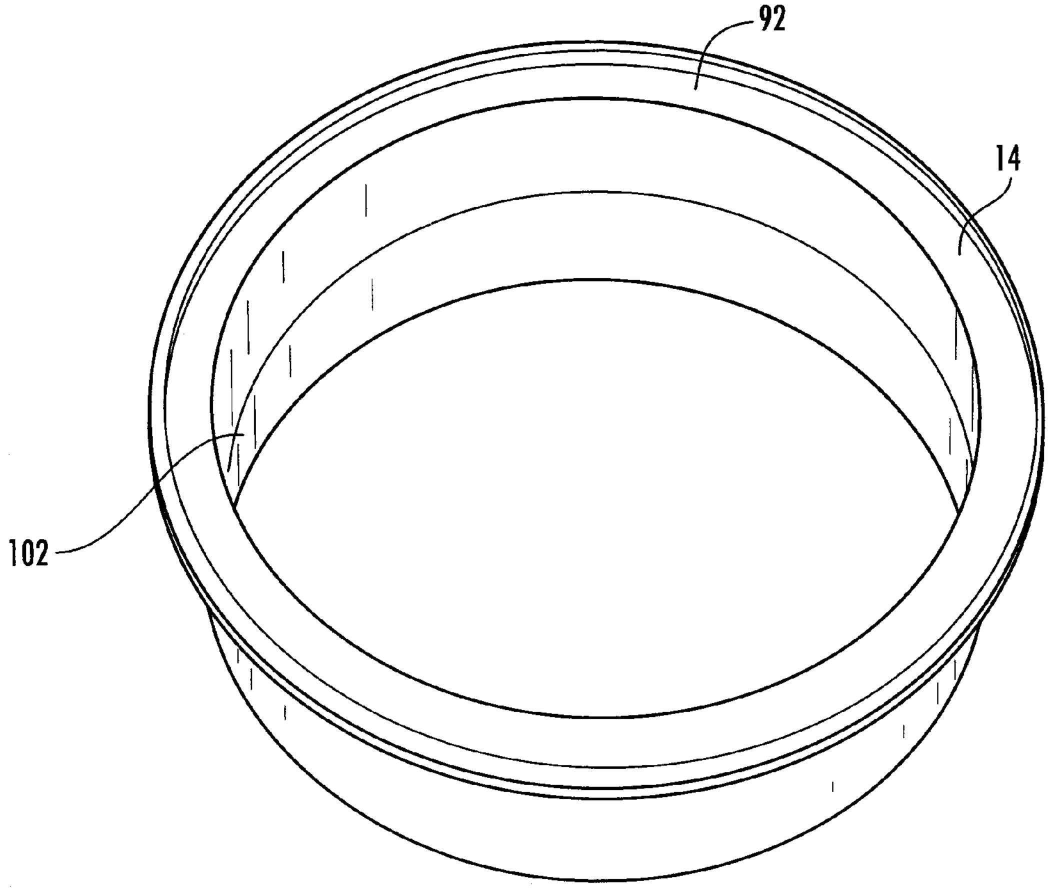
FIG. 30 is a perspective view of the slip ring portion of the aircraft wheel of FIG. 21.
Figure 31:
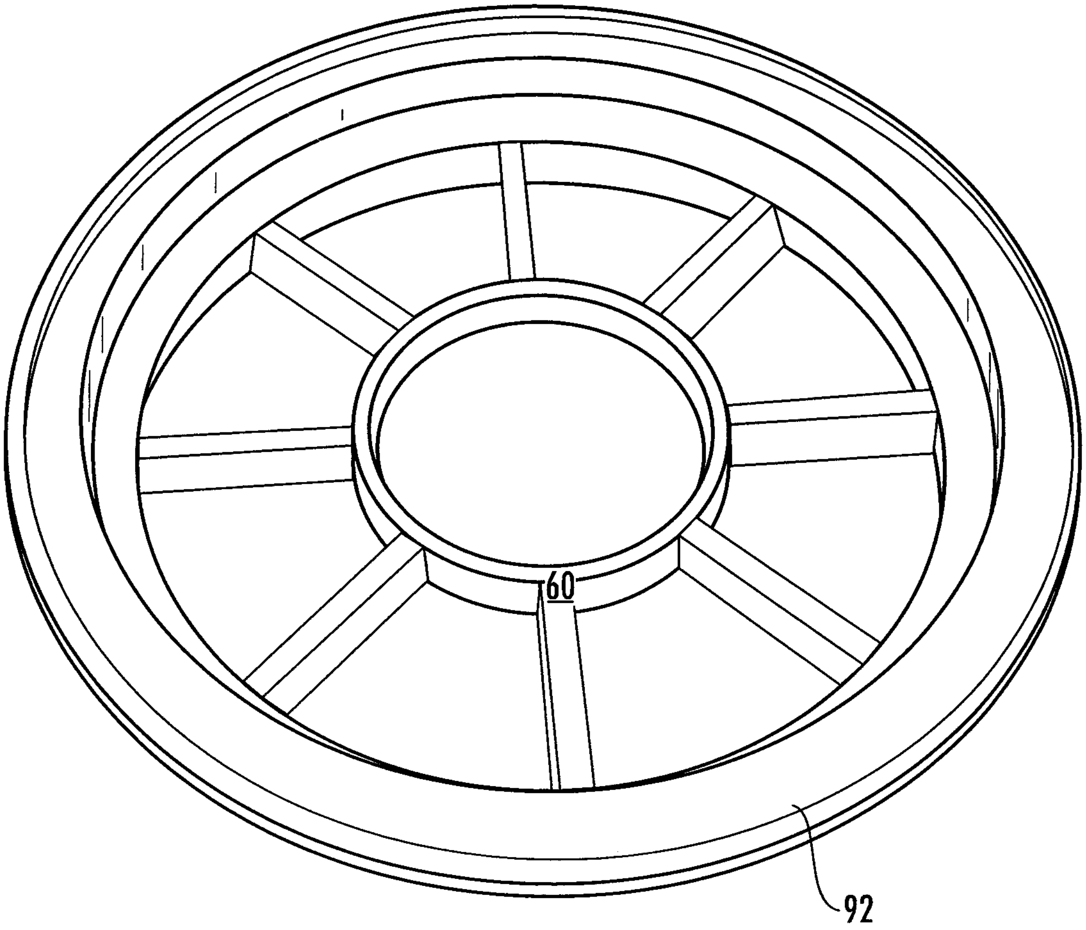
FIG. 31 is a perspective view of the slip ring portion of the aircraft wheel of FIG. 21, illustrated with the sealing ring masking element in position.
Figure 32:
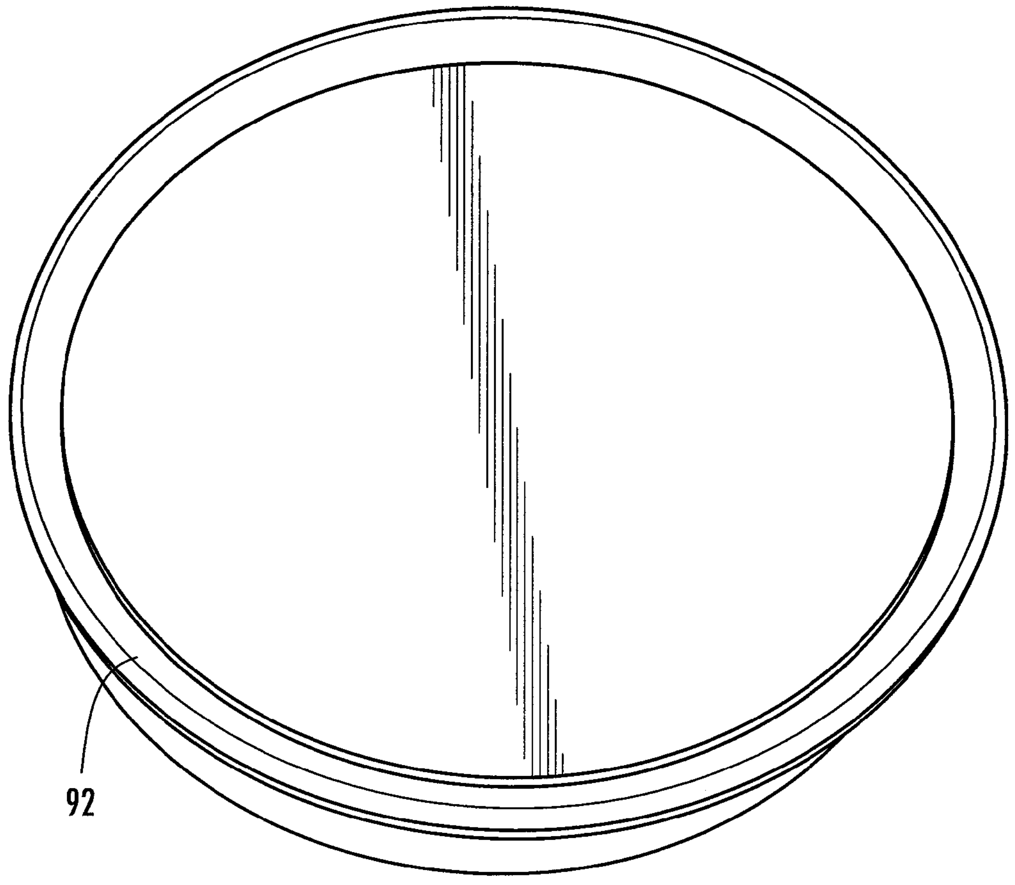
FIG. 32 is a perspective view of the slip ring portion of the aircraft wheel of FIG. 21, illustrated with the first bearing surface masking element in position.
Figure 33:
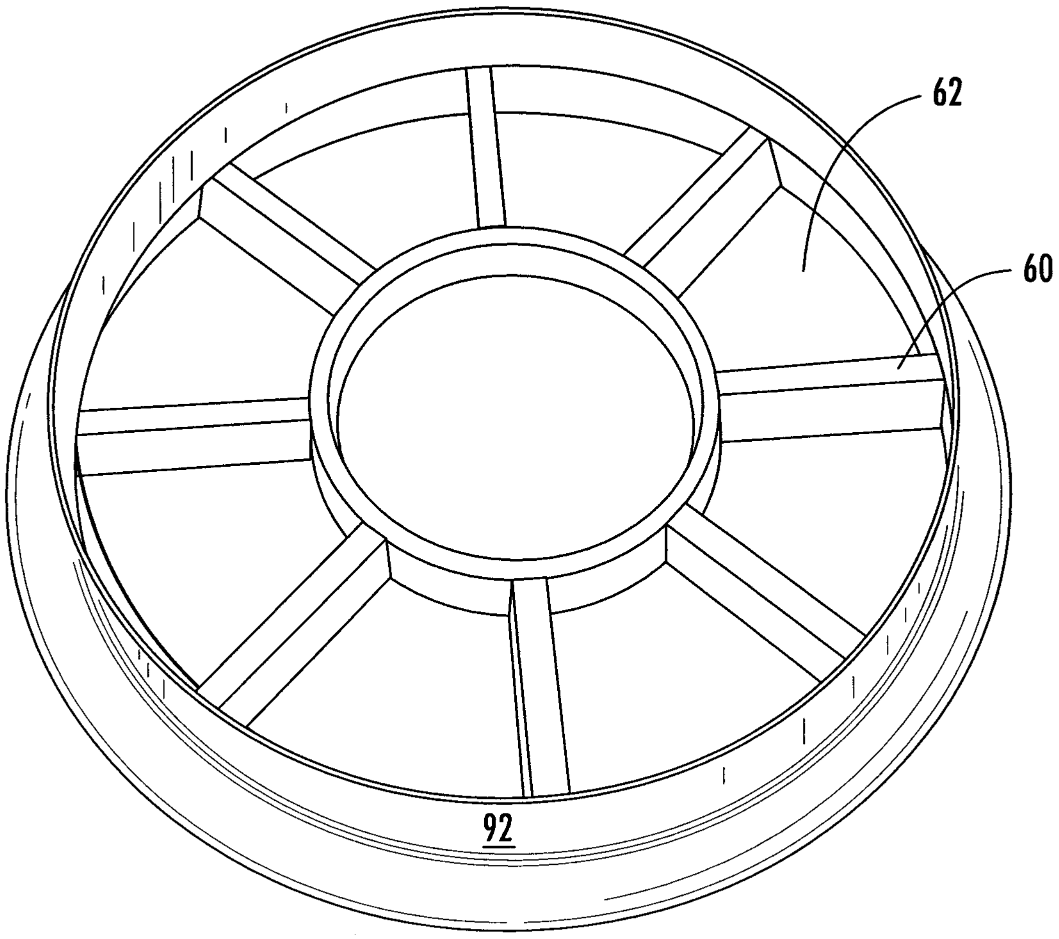
FIG. 33 is a perspective view of the slip ring portion of the aircraft wheel of FIG. 21, illustrated with the first bearing surface masking element and sealing ring masking element in position.
Figure 34:
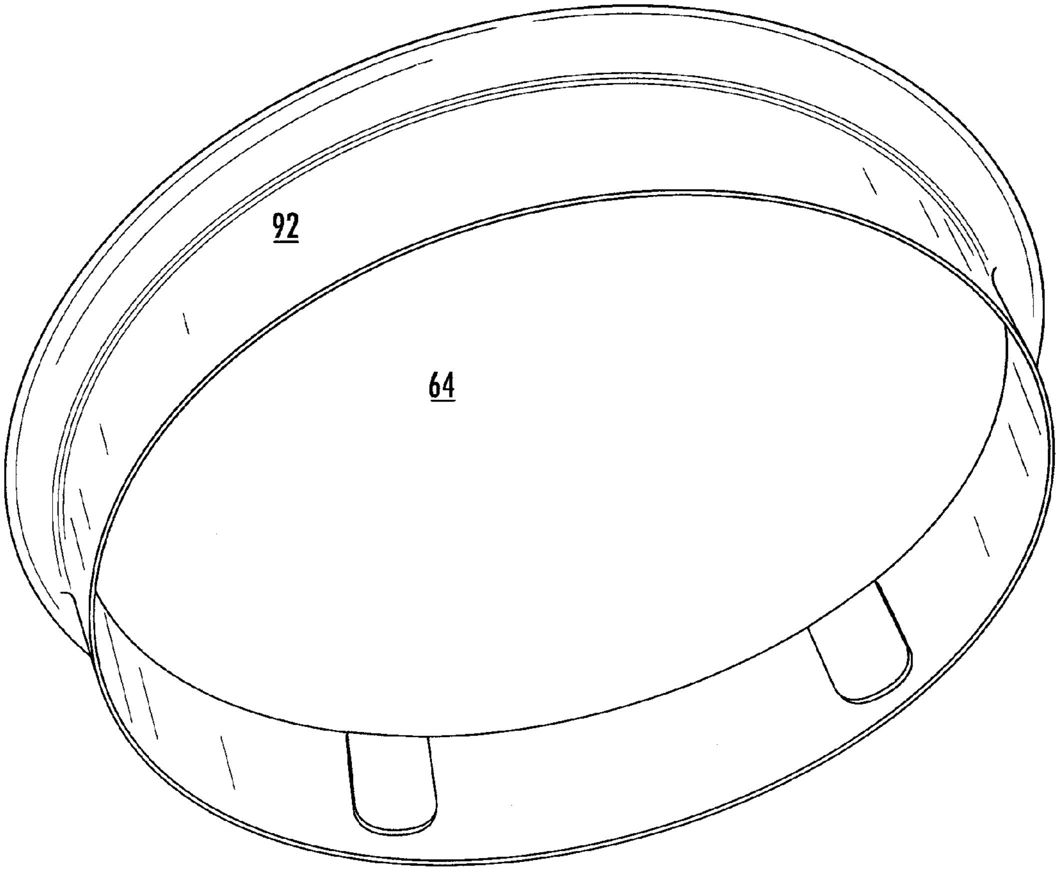
FIG. 34 is a perspective view of the slip ring portion of the aircraft wheel of FIG. 21, illustrated with the second bearing surface masking element in position.

Referring to FIGS. 22-28, the wheel portion 90 and the associated masking kit 96 are illustrated. The masking kit 96 generally includes a first bearing cup masking element 46, a second bearing cup masking element 48, a first inner bore masking element 50, a second inner bore masking element 52, an outer bearing surface masking element 94, drive lug masking elements 54 and a tie rod assembly 68. The first and second bearing cup masking elements are substantially round flat discs in shape having beveled edges 70 and a centrally located aperture 72. The first and second bearing cup masking elements are sized to fit snugly into the inner bore so that a side surface of the masking elements sets against the bearing cup (race) while the beveled edge 70 faces away from the bearing cup to allow primer to be applied to the inner bore of the wheel half right up to the edge of the bearing cup. The central aperture 72 is sized for cooperation with the tie rod assembly 68 to hold the bearing cup masking elements in place within the inner bore 30 as illustrated in FIGS. 24 and 25. Typically, in use, the wheel half would be spray coated with a primer at this stage of the wheel recoating.

The inner bore masking elements 50, 52 are generally disc shaped having a beveled outer perimeter edge 70 and a central aperture 72. The inner bore masking elements 50, 52 are typically slightly larger in diameter than the bearing cup masking elements 46, 48. The inner bore masking elements are constructed and arranged for placement into the inner bore having the beveled edges facing inward so that the outer edge 74 falls proximate to the topcoat paint requirements of the manufacturer. This location is generally close to the edge of the inner bore. The edge provides a suitable contact line to prevent paint and/or overspray from traveling into the inner bore. The central aperture 72 is sized and located to cooperate with the tie bolt 68 holding the bearing cup masking elements in place. This construction allows the inner bore masking elements to be added to the assembly without requiring removal of the bearing cup masking elements. The outer bearing surface masking element 94 includes an inner cylindrical surface 98 having a diameter that substantially matches the outer diameter of the wheel bearing surface 100. The outer surface of the outer surface bearing masking element includes feet 82 secured thereto. The sized inner diameter 98 allows the bearing surface masking element 94 to be slipped onto the wheel bearing surface 100 for attachment without the need for fasteners or adhesives, see FIG. 26. The drive lug masking elements 54 are generally elongated elements having a channel 88 sized for a slight interference fit with the drive lugs of the wheel portion. This construction allows the drive lug masking elements to be snapped into place without adhesive or fasteners. Once attached the exposed surfaces of the wheel can be painted with topcoat. The wheel can then be inverted for support by the feet 82, allowing the remaining portions of the wheel to be painted with topcoat. This eliminates a drying cycle that is typically required with the prior art. Once the topcoat layer has cured, the masking elements can be removed from the wheel half with tools for reuse. The masking elements are preferably constructed from a polymeric material such as plastic. In a most preferred embodiment, the masking elements are constructed from a high density polyethylene material (HDPE). This material has exhibited good temperature stability and overspray can be easily removed from surfaces after use. It should be noted that other materials may be utilized without departing from the scope of the invention. Such materials may include, but should not be limited to metals, woods, phenolics and suitable combinations thereof.

Referring to FIGS. 29-34, the slip ring and associated masking kit 98 are illustrated. The masking kit generally includes a slip ring masking element 60, a first bearing surface masking element 62, a second bearing surface masking element 64 and a second tie rod 69. In operation, the slip ring mask element is sized for insertion into the bearing surface of the slip ring 92, see FIG. 31. At this stage the slip ring may be coated with a primer. The first and second bearing surface masking elements 62, 64 are constructed and arranged for placement into the bearing bore 102 having beveled edges 70 facing inward so that the outer edge 104 falls proximate to the topcoat paint requirements of the manufacturer. This location is generally close to the edge of the bearing bore. The edge 104 provides a suitable contact line to prevent paint and/or overspray from traveling into the bearing bore. The central aperture 72 is sized and located to cooperate with the tie bolt 68 to hold the bearing surface masking elements in place. This construction allows the bearing surface masking elements to be added to the assembly without requiring removal of the slip ring masking element.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A masking kit for an aircraft wheel comprising:

a first bearing cup masking element, said first bearing cup masking element being a substantially round flat disc sized to snugly fit in a centrally located inner bore of an aircraft wheel half adjacent a bearing cup positioned in said aircraft wheel half;

a second bearing cup masking element, said second bearing cup masking element being a substantially round flat disc sized to snugly fit in a centrally located inner bore of an aircraft wheel half adjacent a bearing cup positioned in said aircraft wheel half;

a first inner bore masking element, said first inner bore masking elements being disc shaped and slightly larger in diameter than said first and second bearing cup masking elements, said first inner bore masking element constructed and arranged for placement into said inner bore of said wheel half proximate to the edge of said inner bore to substantially prevent paint and overspray from traveling into said inner bore;

a second inner bore masking element, said second inner bore masking element being disc shaped and slightly larger in diameter than said first and second bearing cup masking elements, said second inner bore masking element constructed and arranged for placement into said inner bore of said wheel half proximate to the edge of said inner bore to substantially prevent paint and overspray from traveling into said inner bore;

a packing surface masking element in the shape of a circular ring having an inner face and an outer face, said inner face constructed and arrange to cooperate with a wheel packing surface;

at least one drive lug masking element constructed as an elongated element having a channel sized for a slight interference fit with a drive lug of said aircraft wheel half;

whereby said aircraft wheel masking kit is adapted to be secured to said aircraft wheel half without fasteners or adhesive to prevent unwanted application of surface coating to portions of said wheel half covered by said masking elements.

2. The aircraft wheel masking kit of claim 1 including a tie rod assembly, said tie rod assembly including an elongated member and at least one fastener adapted for securement to said elongated member, said first and said second bearing cup masking elements including a centrally located aperture sized to allow passage of said elongated member therethrough, whereby said elongated member is adapted to be placed through said centrally located apertures of said first and second masking elements after placement within said inner bore and said at least one fastener is adapted to be used to secure said first and second bearing cup masking elements in position within said inner bore.

3. The aircraft wheel masking kit of claim 2 wherein said elongated member is a threaded rod and said at least one fastener is an internally threaded element.

4. The aircraft wheel masking kit of claim 2 wherein said tie rod assembly includes an elongated member having a length longer than the length of said inner bore and at least four fasteners, said first and said second inner bore masking elements each including a centrally located aperture sized to allow passage of said elongated member therethrough, whereby said first and said second inner bore masking elements is adapted to be assembled onto said elongated member after assembly of said first and said second bearing cup masking elements and two of said at least fasteners can be utilized to secure said first and said second inner bore masking members to said elongated member.

5. The aircraft wheel masking kit of claim 1 wherein said first and said second bearing cup masking elements include a beveled edge, whereby a side surface of each said bearing cup masking element is positioned adjacent to said bearing cup, said beveled edge facing away from said bearing cup.

6. The aircraft wheel masking kit of claim 5 wherein said bearing cup masking element is constructed from a polymeric material.

7. The aircraft wheel masking kit of claim 6 wherein said polymeric bearing cup masking element material is high density polyethylene.

8. The aircraft wheel masking kit of claim 1 wherein said first and said second inner bore masking elements include a beveled edge, whereby said beveled edge faces inward so that an outer edge of each said first and second inner bore masking element falls proximate to the edge of said inner bore, whereby said outer edge provides a contact line around the perimeter of said inner bore.

9. The aircraft wheel masking kit of claim 1 wherein said wheel packing masking element includes an inner face having contours that substantially match the contour of said wheel packing surface.

10. The aircraft wheel masking kit of claim 9 wherein said wheel packing masking element includes an outer face having feet secured thereto, said feet constructed and arranged to support said wheel half when placed on a surface.

11. The aircraft wheel masking kit of claim 1 including a packing groove masking element, said packing groove masking element sized and shaped to cooperate with a wheel packing groove in an interlocking manner.

12. The aircraft wheel masking kit of claim 11 wherein said packing groove masking element is constructed and arranged for a snap lock interference fit with said packing groove.

13. The aircraft wheel masking kit of claim 1 wherein each said at least one drive lug masking element is constructed and arranged to fit over a drive lug formed on said aircraft wheel half to prevent unwanted application of surface coatings thereto.

14. The aircraft wheel masking kit of claim 13 wherein each said at least one drive lug masking element is substantially U-shaped when viewed from the end, an inner surface of said U-shape conforming substantially to an outer surface of said drive lug.

15. The aircraft wheel masking kit of claim 1 wherein said aircraft wheel half includes a slip ring and an associated split ring for securing said slip ring to said wheel half, said aircraft wheel masking kit including a packing surface masking element that includes an outer bearing surface masking element, said outer surface masking element including an inner cylindrical surface having a diameter that substantially matches the outer diameter of a wheel bearing surface for a slip fit therebetween, whereby said outer bearing surface masking element can be snap fit to said wheel half without fasteners or tools.

16. The aircraft wheel masking kit of claim 15 including a slip ring masking element, said slip ring masking element sized for insertion into a bearing surface of said slip ring.

17. The aircraft wheel masking kit of claim 16 including a first bearing surface masking element, said first bearing surface masking element sized and shaped to slip fit into a bearing bore of said slip ring to prevent surface coating material from entering said bearing surface bore; a second bearing surface masking element, said second bearing surface masking element sized and shaped to slip fit into a bearing bore of said slip ring to prevent surface coating material from entering said bearing surface bore.

18. The aircraft wheel masking kit of claim 17 wherein said first and said second bearing surface masking elements include a beveled edge, whereby said beveled edge faces inward so that an outer edge of each said first and second bearing surface masking element falls proximate to the edge of said bearing bore, whereby said outer edge provides a contact line around the perimeter of said bearing bore.

19. The aircraft wheel masking kit of claim 18 wherein said first and said second bearing surface masking elements include a central bore, said central bore sized and shaped to cooperate with a second tie rod assembly for securing said first and second bearing surface assemblies in position within said slip ring.

* * * * *